US010037270B2

(12) United States Patent
Bak et al.

(10) Patent No.: US 10,037,270 B2
(45) Date of Patent: Jul. 31, 2018

(54) REDUCING MEMORY COMMIT CHARGE WHEN COMPRESSING MEMORY

(71) Applicant: Microsoft Technology Licensing, LLC, Redmond, WA (US)

(72) Inventors: Yevgeniy M. Bak, Redmond, WA (US); Mehmet Iyigun, Kirkland, WA (US); Landy Wang, Honolulu, HI (US); Arun U. Kishan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/685,977

(22) Filed: Apr. 14, 2015

(65) Prior Publication Data
US 2016/0306738 A1 Oct. 20, 2016

(51) Int. Cl.
*G06F 12/02* (2006.01)
*G06F 12/08* (2016.01)
(Continued)

(52) U.S. Cl.
CPC ............ *G06F 12/023* (2013.01); *G06F 12/08* (2013.01); *G06F 12/1009* (2013.01);
(Continued)

(58) Field of Classification Search
CPC .... G06F 12/02; G06F 12/023; G06F 12/0223; G06F 12/0253
See application file for complete search history.

(56) References Cited

U.S. PATENT DOCUMENTS

| 5,101,485 A | 3/1992 | Perazzoli, Jr. |
| 5,125,086 A | 6/1992 | Perazzoli |

(Continued)

FOREIGN PATENT DOCUMENTS

| CN | 100530142 | 8/2009 |
| EP | 0097256 | 1/1984 |

(Continued)

OTHER PUBLICATIONS

"Commit Charge", Retrieved from the internet at: http://web.archive.org/web/20150225012244/http://en.wikipedia.org/wiki/Commit_charge—dated Apr. 28, 2016, 2 pages.

(Continued)

*Primary Examiner* — Hal Schnee

(57) ABSTRACT

A set of memory pages from a working set of a program process, such as at least some of the memory pages that have been modified, are compressed into a compressed store prior to being written to a page file, after which the memory pages can be repurposed by a memory manager. The memory commit charge for the memory pages compressed into the compressed store is borrowed from the program process by a compressed storage manager, reducing the memory commit charge of the compressed storage manager. Subsequent requests from the memory manager for memory pages that have been compressed into a compressed store are satisfied by accessing the compressed store memory pages (including retrieving the compressed store memory pages from the page file if written to the page file), decompressing the requested memory pages, and returning the requested memory pages to the memory manager.

20 Claims, 8 Drawing Sheets

(51) Int. Cl.
  *G06F 12/1009* (2016.01)
  *G06F 9/50* (2006.01)
(52) U.S. Cl.
  CPC .... *G06F 9/5016* (2013.01); *G06F 2212/1044* (2013.01); *G06F 2212/401* (2013.01); *G06F 2212/657* (2013.01)

(56) References Cited

U.S. PATENT DOCUMENTS

| | | |
|---|---|---|
| 5,247,687 A | 9/1993 | Eilert et al. |
| 5,388,242 A | 2/1995 | Jewett |
| 5,394,537 A | 2/1995 | Courts et al. |
| 5,517,643 A | 5/1996 | Davy |
| 5,555,399 A | 9/1996 | Waldron et al. |
| 5,594,881 A | 1/1997 | Fecteau |
| 5,628,023 A | 5/1997 | Bryant |
| 5,696,926 A | 12/1997 | Culbert |
| 5,758,174 A | 5/1998 | Crump et al. |
| 5,802,599 A | 9/1998 | Cabrera et al. |
| 5,826,057 A | 10/1998 | Okamoto et al. |
| 5,966,735 A | 10/1999 | Noel et al. |
| 6,128,713 A | 10/2000 | Eisler et al. |
| 6,298,422 B1 | 10/2001 | Spilo et al. |
| 6,330,572 B1 | 12/2001 | Sitka |
| 6,349,372 B1 | 2/2002 | Benveniste |
| 6,442,661 B1 * | 8/2002 | Dreszer ............... G06F 12/023 707/999.202 |
| 6,442,664 B1 | 8/2002 | Maynard et al. |
| 6,473,842 B1 | 10/2002 | Tsutsumi |
| 6,496,909 B1 | 12/2002 | Schimmel |
| 6,496,912 B1 | 12/2002 | Fields, Jr. et al. |
| 6,516,397 B2 | 2/2003 | Roy |
| 6,564,305 B1 | 5/2003 | Moore |
| 6,681,239 B1 | 1/2004 | Monroe et al. |
| 6,877,081 B2 | 4/2005 | Herger |
| 6,956,507 B2 | 10/2005 | Castelli et al. |
| 6,968,424 B1 | 11/2005 | Danilak |
| 7,024,512 B1 | 4/2006 | Franaszek |
| 7,185,155 B2 | 2/2007 | Sechrest et al. |
| 7,197,590 B2 | 3/2007 | Chiu |
| 7,437,529 B2 | 10/2008 | Burugula et al. |
| 7,475,183 B2 | 1/2009 | Traut et al. |
| 7,587,572 B1 * | 9/2009 | Stenstrom ............... G06F 12/08 711/173 |
| 7,610,437 B2 | 10/2009 | Sinclair et al. |
| 7,624,240 B1 | 11/2009 | Colbert et al. |
| 7,698,513 B2 | 4/2010 | Sechrest et al. |
| 7,797,510 B1 | 9/2010 | Case et al. |
| 7,895,242 B2 | 2/2011 | Ergan |
| 8,015,367 B1 | 9/2011 | Rao et al. |
| 8,099,568 B2 | 1/2012 | Colbert et al. |
| 8,386,740 B2 | 2/2013 | Devendra et al. |
| 8,484,405 B2 | 7/2013 | Mashtizadeh et al. |
| 8,495,267 B2 | 7/2013 | Abali et al. |
| 8,516,005 B2 | 8/2013 | Ergan et al. |
| 8,539,186 B2 | 9/2013 | Sechrest et al. |
| 8,832,411 B2 | 9/2014 | Iyigun et al. |
| 9,081,702 B2 | 7/2015 | Iyigun et al. |
| 9,632,924 B2 | 4/2017 | Bak et al. |
| 9,684,625 B2 | 6/2017 | Bak et al. |
| 2002/0065867 A1 | 5/2002 | Chauvel |
| 2002/0073298 A1 | 6/2002 | Geiger et al. |
| 2002/0147893 A1 | 10/2002 | Roy et al. |
| 2003/0037060 A1 | 2/2003 | Kuehnel |
| 2003/0061457 A1 | 3/2003 | Geiger et al. |
| 2003/0079081 A1 | 4/2003 | Okada |
| 2004/0030847 A1 | 2/2004 | Tremaine |
| 2004/0068627 A1 | 4/2004 | Sechrest et al. |
| 2005/0132161 A1 | 6/2005 | Makela et al. |
| 2006/0161912 A1 | 7/2006 | Barrs et al. |
| 2007/0005911 A1 | 1/2007 | Yang |
| 2007/0101108 A1 | 5/2007 | Grossman et al. |
| 2007/0156386 A1 | 7/2007 | Guenthner |
| 2009/0112949 A1 | 4/2009 | Ergan |
| 2009/0327621 A1 | 12/2009 | Kliot et al. |
| 2011/0072235 A1 | 3/2011 | Deming et al. |
| 2011/0107007 A1 | 5/2011 | van Riel et al. |
| 2011/0113432 A1 | 5/2011 | Ergan et al. |
| 2011/0153978 A1 | 6/2011 | Chalemin et al. |
| 2011/0238943 A1 | 9/2011 | Devendran et al. |
| 2011/0271070 A1 | 11/2011 | Worthington et al. |
| 2012/0036325 A1 * | 2/2012 | Mashtizadeh ....... G06F 12/0802 711/118 |
| 2012/0151127 A1 | 6/2012 | Lim |
| 2012/0233438 A1 | 9/2012 | Bak et al. |
| 2012/0239899 A1 * | 9/2012 | Adderly ............... G06F 9/5016 711/170 |
| 2013/0031293 A1 | 1/2013 | Van Riel |
| 2013/0036299 A1 | 2/2013 | Itoh |
| 2013/0159662 A1 | 6/2013 | Iyigun et al. |
| 2013/0160011 A1 | 6/2013 | Corrie |
| 2013/0326170 A1 | 12/2013 | Kilari et al. |
| 2014/0006745 A1 | 1/2014 | Fontenot et al. |
| 2014/0052946 A1 * | 2/2014 | Kimmel ............... G06F 12/02 711/159 |
| 2014/0149634 A1 | 5/2014 | Tosatti et al. |
| 2014/0164686 A1 * | 6/2014 | Choi .................. G06F 3/0604 711/103 |
| 2014/0189195 A1 | 7/2014 | Chen et al. |
| 2014/0189281 A1 | 7/2014 | Sokol, Jr. |
| 2014/0244603 A1 | 8/2014 | Arges et al. |
| 2014/0282589 A1 * | 9/2014 | Kuang ................ G06F 9/5016 718/104 |
| 2014/0351552 A1 | 11/2014 | Iyigun et al. |
| 2014/0372715 A1 | 12/2014 | Bak et al. |
| 2015/0106582 A1 * | 4/2015 | Mai ................... G06F 3/0649 711/165 |
| 2015/0178222 A1 | 6/2015 | Hopper et al. |
| 2015/0242432 A1 | 8/2015 | Bak et al. |
| 2015/0269111 A1 | 9/2015 | Bak et al. |
| 2016/0259720 A1 | 9/2016 | Bak et al. |

FOREIGN PATENT DOCUMENTS

| | | |
|---|---|---|
| EP | 0346039 | 12/1989 |
| EP | 0723229 A1 | 7/1996 |
| EP | 1406174 | 4/2004 |
| KR | 102011008598 | 7/2011 |
| KR | 101221241 | 1/2013 |
| WO | WO-1995018997 | 7/1995 |

OTHER PUBLICATIONS

"International Preliminary Report on Patentability", Application No. PCT/US2015/021129, Feb. 29, 2016, 6 pages.
"International Preliminary Report on Patentability", Application No. PCT/US2015/016237, Feb. 23, 2016, 8 pages.
"International Search Report and Written Opinion", Application No. PCT/US2015/021129, May 28, 2015, 10 Pages.
"International Search Report and Written Opinion", Application No. PCT/US2016/018559, May 18, 2016, 14 pages.
"Non-Final Office Action", U.S. Appl. No. 13/917,149, dated Oct. 23, 2015, 17 pages.
"Non-Final Office Action", U.S. Appl. No. 14/221,829, dated Feb. 26, 2016, 27 pages.
Tuduce,"Adaptive Main Memory Compression", Retrieved from <http://www.lst.inf.ethz.ch/research/publications/publications/USENIX_2005/USENIX_200 5.pdf>, 2005, 14 pages.
"International Search Report and Written Opinion Issued in PCT Application No. PCT/US2016/024597", dated May 18, 2016, 11 Pages.
"Final Office Action", U.S. Appl. No. 13/042,128, dated Nov. 21, 2013, 15 pages.
"Foreign Office Action", CN Application No. 201210540976.9, dated Dec. 3, 2014, 13 Pages.
"Hack 92 Getting the Most Out of Your RAM", Retrieved from <http://www.csie.ntu.edu.tw/~b90047/ebook/winXPhack/0596005113_winxphks-chp-11-sect-3.html> on Oct. 28, 2014, May 8, 2007, 3 pages.

(56) References Cited

OTHER PUBLICATIONS

"How to determine the appropriate page file size for 64-bit versions of Windows", Retrieved from <> on Oct. 28, 2014, Nov. 27, 2013, 3 pages.

"How VMware vSphere is saving physical memory?", Retrieved from <http://www.unixarena.com/2014/07/how-vmware-vsphere-is-saving-physical-memory.html> on Oct. 28, 2014, Jul. 31, 2014, 3 pages.

"HP OpenVMS System Services Reference Manual", Retrieved from <http://h71000www7.hp.com/doc/83final/4527/4527pro_022.html>> on Dec. 1, 2011, 7 pages.

"International Search Report and Written Opinion", Application No. PCT/US2012/069602, dated May 30, 2013, 10 pages.

"International Search Report and Written Opinion", Application No. PCT/US2013/060505, dated Feb. 7, 2014, 10 pages.

Microsoft "Working Set", Retrieved from <<http://msdn.microsoft.com/en-us/library/windows/desktop/cc441804%28d=printer,v=vs.85%29>> May 22, 2014, 2 pages.

"Non-Final Office Action", U.S. Appl. No. 13/042,128, dated May 2, 2014, 13 pages.

"Non-Final Office Action", U.S. Appl. No. 11/933,364, dated Jul. 22, 2010, 10 pages.

"Non-Final Office Action", U.S. Appl. No. 13/006,229, dated Oct. 1, 2012, 15 pages.

"Non-Final Office Action", U.S. Appl. No. 13/006,229, dated May 25, 2012, 6 pages.

"Non-Final Office Action", U.S. Appl. No. 13/042,128, dated Apr. 3, 2013, 12 pages.

"Non-Final Office Action", U.S. Appl. No. 13/326,182, dated Aug. 16, 2013, 5 pages.

"Non-Final Office Action", U.S. Appl. No. 14/456,128, dated Oct. 7, 2014, 5 pages.

"Notice of Allowance", U.S. Appl. No. 11/933,364, dated Nov. 6, 2010, 6 pages.

"Notice of Allowance", U.S. Appl. No. 13/006,229, dated Apr. 4, 2013, 12 pages.

"Notice of Allowance", U.S. Appl. No. 13/326,182, dated Jan. 15, 2014, 7 Pages.

"Notice of Allowance", U.S. Appl. No. 13/326,182, dated May 9, 2014, 7 Pages.

"Notice of Allowance", U.S. Appl. No. 13/326,182, dated Jul. 2, 2014, 7 Pages.

"Notice of Allowance", U.S. Appl. No. 14/456,128, dated Mar. 6, 2015, 8 pages.

"Supplemental Notice of Allowance", U.S. Appl. No. 13/006,229, dated Jul. 9, 2013, 2 pages.

"Understanding Memory Resource Management in VMware ESX 4.1", Retreived from <http://www.vmware.com/files/pdf/techpaper/vsp_41_perf_memory_mgmt.pdf> on Mar. 21, 2013, Jul. 21, 2010, 25 pages.

"VMware vSphere 4—ESX and vCenter Server—Memory Compression", Retrieved from <http://pubs.vmware.com/vsphere-4-esx-vcenter/index.jsp?topic=/com.vmware.vsphere.resourcemanagement.doc_41/managing_memory_resources/c_memory_compression.html> on Oct. 28, 2014, 2009, 1 page.

"Working Set", Retrieved From: ,http://msdn.microsoft.com/en-us/library/windows/desktop/cc441804(v=vs.85).aspx> Feb. 19, 2014, Nov. 16, 2013, 1 Page.

Azimi,"Path: Page Access Tracking to Improve Memory Management", Proc. 6th Intl Symposium on Memory Management, Oct. 2007, 10 pages.

Carp,"The Standby List and Storage Overprovisioning", Retrieved from <http://fsfilters.blogspot.in/2012/04/standby-list-and-storage.html> on Mar. 22, 2013, Apr. 19, 2012, 5 pages.

Clark,"Selective Page Updating", IP.com Prior Art Database Technical Disclosure, 1987, 3 Pages.

de"Adaptive Compressed Caching: Design and Implementation", IEEE, Retrieved from <http://linuxcompressed.sourceforge.net/docs/files/paper.pdf>, 2003, 15 pages.

Denneman,"Disable ballooning?", Retrieved from <http://frankdenneman.nl/2010/11/29/disable-ballooning/> on Oct. 28, 2014, Nov. 29, 2010, 12 pages.

Dilger,"Compressed Memory in OS X 10.9 Mavericks Aims to Free RAM, Extend Battery Life", Retrieved From: <http://appleinsider.com/articles/13/06/12/compressed-memory-in-os-x-109-mavericks-aims-to-free-ram-extend-battery-life> Jan. 22, 2014, Jun. 12, 2013, 10 Pages.

Freedman,"The Compression Cache: Virtual Memory Compression for Handheld Computers", MIT Lab for Computer Science, Retrieved from <http://www.scs.stanford.edu/mfreed/docs/6.033/compression.pdf>, Mar. 16, 2000, 16 pages.

Gupta,"Compcache: In-Memory Compressed Swapping", Retrieved from <http://lwn.net/Articles/334649/> on Mar. 20, 2013, May 26, 2009, 6 pages.

Huffman,"How to Size Page Files on Windows Systems", Retrieved from <http://mcpmag.com/articles/2011/07/05/sizing-page-files-on-windows-systems.aspx> on Oct. 28, 2014, Jul. 5, 2011, 9 pages.

Jenner,"Address Space Suballocation in a Virtual Storage Environment", IP.com Prior Art Database Technical Disclosure, 1973, 6 Pages.

Russinovich,"Inside the Windows Vista Kernel: Part 2", Retrieved from <http://technet.microsoft.com/en-us/magazine/2007.03.vistakernel.aspx> on Mar. 21, 2013, Mar. 2007, 8 pages.

Russinovich,"Pushing the Limits of Windows: Virtual Memory", Retrieved from <http://blogs.technet.com/b/markrussinovich/archive/2008/11/17/3155406.aspx> on Oct. 28, 2014, Nov. 17, 2008, 10 pages.

Speight,"Delphi: Prediction-Based Page Prefetching to Improve the Performance ofShared Virtual Memory Systems", In Proceedings: International Conference on Parallel and Distributed Processing Techniques and Applications, Jul. 25, 2013, 7 Pages.

Tuduce,"Adaptive Main Memory Compression", Doctoral Dissertation, Swiss Federal Institute of Technology Zurich, Available at <http://www.Ist.ethz.ch/research/publications/DISS_ETH_16327/DISS_ETH_16327.pdf>, 2005, 141 pages.

Wilson,"The Case for Compressed Caching in Virtual Memory Systems", USENIX Association, Jun. 6-11, 1999. Retrieved from <http://www.usenix.org/events/usenix99/full_papers/wilson/wilson.pdf>, 1999, 33 pages.

"International Search Report and Written Opinion", Application No. PCT/US2015/016237, dated Nov. 5, 2015, 10 pages.

"Final Office Action", U.S. Appl. No. 14/221,829, dated Sep. 22, 2016, 29 pages.

"International Preliminary Report on Patentability", Application No. PCT/US2016/024597, dated Aug. 23, 2016, 6 pages.

"International Preliminary Report on Patentability", Application No. PCT/US2016/018559, dated Aug. 24, 2016, 7 pages.

"Non-Final Office Action", U.S. Appl. No. 14/187,031, dated Nov. 30, 2016, 18 pages.

"Non-Final Office Action", U.S. Appl. No. 14/635,302, dated Aug. 15, 2016, 9 pages.

"Supplemental Notice of Allowance", U.S. Appl. No. 14/221,829, dated May 24, 2017, 4 pages.

"Non-Final Office Action", U.S. Appl. No. 14/187,031, dated May 17, 2017, 8 pages.

"Foreign Office Action", EP Application No. 13773957.9, dated Feb. 27, 2017, 7 pages.

"Notice of Allowance", U.S. Appl. No. 14/221,829, dated Mar. 9, 2017, 8 pages.

"Notice of Allowance", U.S. Appl. No. 14/635,302, dated Dec. 28, 2016, 5 pages.

"Final Office Action", U.S. Appl. No. 13/917,149, dated Jun. 13, 2016, 20 pages.

"Final Office Action", U.S. Appl. No. 14/187,031, dated Jan. 12, 2018, 9 pages.

"Foreign Office Action", EP Application No. 13773957.9, dated Oct. 2, 2017, 5 pages.

"Non-Final Office Action", U.S. Appl. No. 13/917,149, dated Jul. 13, 2017, 19 pages.

"Foreign Office Action", CN Application No. 201380077440.0, dated Mar. 6, 2018, 11 pages.

(56) References Cited

OTHER PUBLICATIONS

"Foreign Office Action", EP Application No. 15715015.2, dated Mar. 9, 2018, 5 pages.

\* cited by examiner

REDUCING MEMORY COMMIT CHARGE WHEN COMPRESSING MEMORY

BACKGROUND

As computer technology has advanced, the performance of computer processors has increased. This increased performance has resulted in more complex computer programs providing increased functionality to users. However, this increased performance is not without its problems. One such problem is that as the computer programs become more complex, they use increased amounts of computer memory. This has led to a need to include more computer memory in computers, increasing the cost of such computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first set of memory pages that have been allocated to a program and that have been modified are identified, memory commit having been charged to the program for the first set of memory pages. The first set of memory pages are compressed into a compressed store that is made up of a second set of memory pages and is managed by a compressed store manager. The memory commit charge for the first set of memory pages is used or borrowed by the compressed storage manager (e.g., so the compressed storage manager can avoid acquiring its own commit charge for the first set of memory pages), and the memory manager is allowed to repurpose the first set of memory pages after the first set of memory pages has been compressed into the compressed store.

BRIEF DESCRIPTION OF THE DRAWINGS

The same numbers are used throughout the drawings to reference like features.

DETAILED DESCRIPTION

Figure 1:
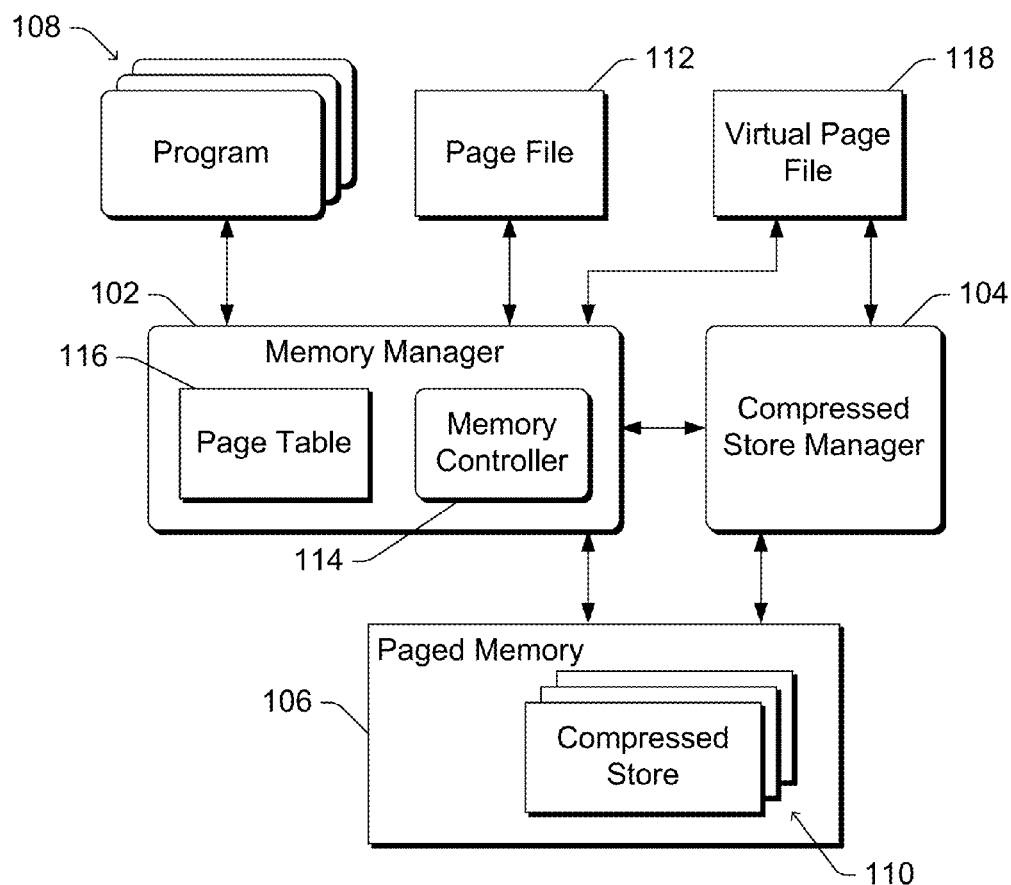
FIG. 1 illustrates an example system reducing memory commit charge when compressing memory in accordance with one or more embodiments.

Reducing memory commit charge when compressing memory is discussed herein. A memory in a system is made up of multiple blocks or portions referred to as memory pages (or simply pages). A set of memory pages from a working set of a program, such as at least some of the memory pages in the working set that have been modified, are compressed into a compressed store prior to being written to a page file. The memory pages can be repurposed by a memory manager after being compressed into the compressed store, regardless of whether the compressed store backing pages have been written to the page file (or paged out). The compressed store is itself made up of multiple memory pages, and the compressed store memory pages can be repurposed by the memory manager after being written to the page file. Subsequent requests from the memory manager for memory pages that have been compressed into a compressed store are satisfied by accessing the compressed store memory pages (including retrieving the compressed store memory pages from the page file if written to the page file), decompressing the requested memory pages, and returning the requested memory pages to the memory manager.

A memory manager in the system allocates amounts of memory to programs running in the system. When memory is allocated to a program, an address space is assigned or allocated to the program. This address space includes the allocated amount of memory, and the memory manager allocates a commit charge for the allocated amount of memory. This allocated amount of memory is the amount of memory that is committed to the program, and is also referred to as the memory commit for the program (or simply the commit for the program) or the memory commit charge for the program. The memory commit guarantees availability of the allocated amount of memory to the program—the memory manager guarantees that if a committed virtual address in the memory allocated to the program is accessed, pages in physical memory (e.g., RAM) can be made available for the address. At the time the memory is allocated to the program, no physical pages need be (but alternatively can be) allocated to the program. A maximum amount of commit charge permissible in the system is equal to the amount of physical memory (e.g., RAM) plus the size of all page files on a storage device that backs the physical memory (e.g., RAM).

In some situations, the program requests to simply reserve an address space without committing the address space. In such situations, that address space cannot be accessed by the program (an access violation exception will be raised on access) until the address space is subsequently committed to the program. The program can commit portions of the reserved memory at a page granularity. The committed pages are pages that the memory manager charges commit for and for which the memory manager guarantees that the program can access the page. A program can also commit pages as part of the initial allocation (i.e., without going through the reserve and then commit sequence).

A compressed store manager manages creation of compressed stores, compression of memory pages, and decompression of memory pages. When the compressed storage manager obtains and compresses a memory page, the compressed storage manager uses or "borrows" the commit charge for the memory page being compressed. The commit charge for the memory page is transferred to the compressed storage manager, so memory commit is not charged to the program for the memory page that is compressed as well as to the compressed storage manager for the memory page containing the compressed data.

FIG. 1 illustrates an example system 100 reducing memory commit charge when compressing memory in accordance with one or more embodiments. The system 100 includes a memory manager 102, a compressed store manager 104, and paged memory 106. Generally, the memory manager 102 manages storage of data in the paged memory 106. The memory manager 102 allocates portions of the paged memory 106 to various programs 108 in the system 100. A program 108, when running, is also referred to herein as a process (which is an instance of a running program 108), so portions of the paged memory 106 allocated to a program 108 are also referred to as allocated to a process of the program 108. The pages allocated to a process are owned by or dedicated to that process and are used by that process and no other process (and thus are also referred to as private pages). The programs 108 can be applications, operating system programs, or other components or modules. The memory manager 102 receives requests from these programs 108 to retrieve data from the paged memory 106 and to write data to the paged memory 106. The paged memory 106 can be, for example, any type of CPU (Central Processing Unit) addressable memory, such as volatile memory (e.g., RAM) or nonvolatile memory (e.g., Flash memory).

The memory manager 102 also allocates one or more portions of the paged memory 106 to the compressed store manager 104. Although illustrated separately, the compressed store manager 104 is treated as a program 108 for purposes of allocating memory pages. However, the compressed store manager 104 is treated differently than programs 108 for purposes of commit charge, as discussed in more detail below. The compressed store manager 104 generates one or more compressed stores 110 for storage of data in compressed form, for example one compressed store 110 for each program 108. The system 100 also includes a page file 112, which is a file on a storage device in which memory pages can be stored. The storage device on which the page file 112 is stored is a secondary storage device in the system 100, and in one or more embodiments has slower read/write times but larger storage capacity than the paged memory 106. The storage device on which the page file 112 is stored can be, for example, Flash memory (e.g., a solid state disk (SSD)) or magnetic disk. Although a single page file 112 is illustrated in FIG. 1, it should be noted that multiple page files can be included in the system 100.

Memory manager 102 manages paged memory 106 using paging. The memory manager 102 organizes the memory 106 (e.g., RAM) into pages, which are a particular (e.g., fixed) size unit of data. The act of paging refers to reading data in units of pages from the backing file, which is page file 112 in system 100, when the data is not in the memory 106. The act of paging also refers to writing dirty (modified) data back in units of pages into the page file 112. The memory pages are thus also referred to as page file backed memory pages. Such paging techniques are well known to those skilled in the art.

Memory that can be paged out (written to the page file 112) and paged in (read from the page file 112) is also referred to as page file backed memory. Using the techniques discussed herein, any page file backed memory can be compressed without additional memory commit (although with a small amount of memory commit overhead) being charged due to the borrowing or using of the commit charge of the memory pages being compressed. Various different types of memory can be page filed backed. For example, process private memory can be page file backed, paged pool memory used by operating system kernel mode components can be page file backed, pageable driver code and data can be page file backed, shared sections of the memory (shared memory that can be allocated by a process and mapped into any other process that can open the shared section, also referred to as page file backed sections) can be page file backed, and so on.

The memory manager 102 includes a memory controller 114 that operates to carry out the functionality of the memory manager 102, and a page table 116 that is a record of various information regarding memory pages of the paged memory 106. The page table 116 includes information indicating where memory pages are stored at any given time. In the discussions below, reference is made to different types of (e.g., states for) private process memory pages. Mappings of other types of memory, such as shared sections (e.g., files or page file backed sections), can have a different format in the page table 116. As discussed in more detail below, memory pages are typically stored in physical memory (paged memory 106) or in a compressed store 110 (which itself may be stored in physical memory or the page file 112), although in some situations uncompressed memory pages may be stored in page file 112. For memory pages stored in uncompressed physical memory, the memory manager 102 accesses the memory pages directly. For memory pages stored in a compressed store 110, the memory manager 102 requests the memory pages from the compressed store manager 104, which retrieves and decompresses the memory pages as appropriate, and returns the decompressed memory pages to the memory manager 102. In the event that an uncompressed memory page is stored in page file 112, the memory manager retrieves the memory page from the page file 112.

The paged memory 106 includes multiple pages that can each be classified as one of multiple different types of pages at any given time, and this classification can change over time. One type of memory page is a memory page that has been allocated to a program 108 and is currently being used by the program 108, and this type of memory page is referred to as a working set page (or alternatively an assigned page) in the working set of a process of the program 108 (also referred to as the working set of the program 108). A memory page currently being used refers to a memory page that has been accessed by the program 108 within a threshold amount of time (e.g., the previous 20 seconds), or is otherwise being accessed by the program 108 in such a manner that the memory page is not to be repurposed by the memory manager 102. Repurposing a memory page refers to the memory page being re-used by the memory manager 102 for something else, such as storing different data for the same or a different program or for other use in the system.

Another type of memory page is a memory page that has been allocated to a program 108 and is not currently being used by the program 108, and this type of memory page is referred to as a standby page (or alternatively a re-assignable page). A memory page not currently being used refers to a page the contents of which have not been modified (or has been written to the page file 112 or a compressed store 110 since last modification) and that has not been accessed by the program 108 within a threshold amount of time (e.g., the previous 20 seconds), or is otherwise being accessed by the program 108 in such a manner that the memory page can be repurposed by the memory manager 102. A memory page can be repurposed by, for example, being assigned to be a different type of page (e.g., working), being allocated to a different program, and so forth.

Another type of memory page is a memory page the contents of which have been modified but not yet copied to the page file 112, and this type of memory page is referred to as a modified page (or alternatively a dirty page). A modified memory page is not to be repurposed by the memory manager 102. However, after compressing and storing a modified memory page in a compressed store 110 (or writing the compressed modified memory page to the page file 112) as discussed in more detail below, the classification of the memory page can be changed (e.g., to a standby page or a free page).

Another type of memory page is a memory page that is not currently allocated to a program 108, and with which the memory manager 102 can do anything (including being repurposed). This type of memory page is referred to as a free page (or alternatively de-allocated page).

The memory manager 102 uses various rules or criteria to determine when memory pages of the paged memory 106 are allocated to programs 108, which memory pages are allocated to which programs 108, which memory pages previously allocated to a program 108 are to be repurposed, and so forth. The memory manager 102 also determines the classification for types of memory pages, changing the classifications of memory pages as appropriate. In one or more embodiments, the memory manager 102 maintains a list or other record of which memory pages of the paged memory 106 are classified as which type of page. For example, the memory manager 102 can maintain a list or other record of working set pages, a list or other record of standby pages, a list or record of modified pages, a list or record of free pages, and so forth.

The system 100 represents one or more devices. In one or more embodiments, the components 102-108 illustrated in the system 100 are included as part of the same computing device. Alternatively, the components can be spread across two or more devices. The one or more devices implementing the system 100 can be one or more of a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), a television or other display device, an automotive computer, and so forth.

Figure 2:
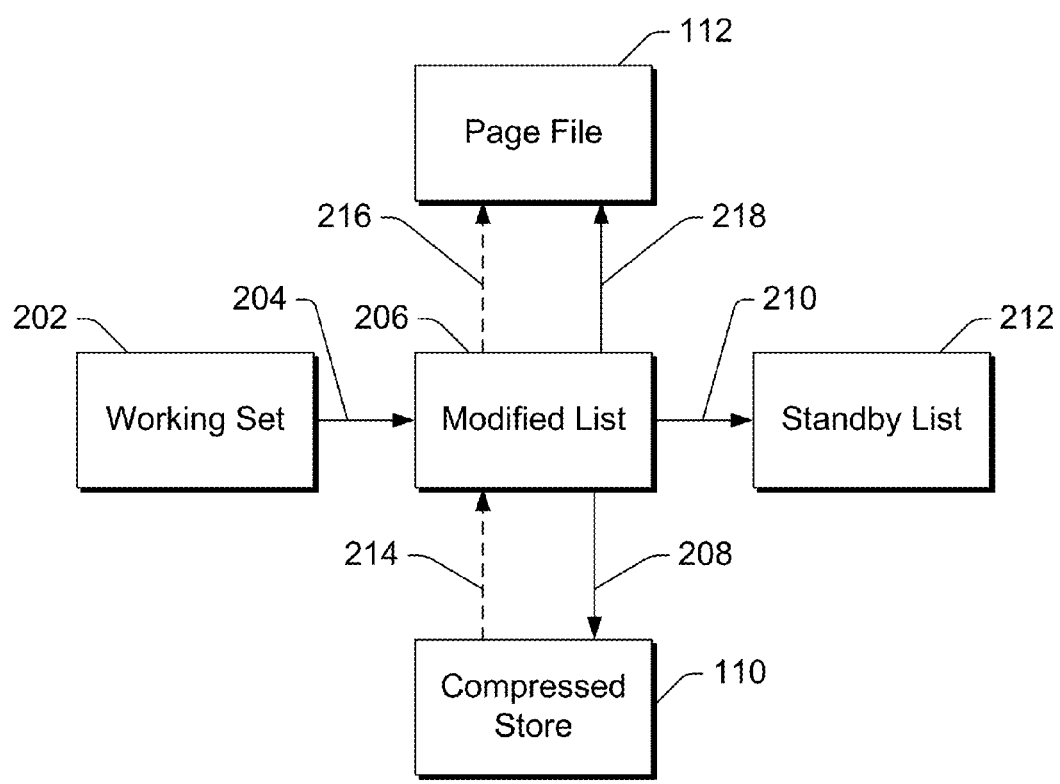
FIG. 2 illustrates an example lifecycle of memory pages in accordance with one or more embodiments.

FIG. 2 illustrates an example lifecycle 200 of memory pages in accordance with one or more embodiments. A memory page can be allocated to a program, and included in a working set 202 of the program. The working set 202 of the program includes working set pages of the program. The memory manager 102 can trim (also referred to as reduce) the memory pages in the working set 202 of the program at various times and for various reasons, such as to make memory pages available for other programs. Memory pages that have been written to (modified) and trimmed from the working set 202 are moved 204 to a modified list 206 of memory pages.

The compressed store manager 104 compresses memory pages in the modified list 206 and adds 208 the compressed memory pages to memory pages of the compressed store 110. The compressed store manager 104 can determine the timing of when to compress memory pages in the modified list in different manners, such as compress memory pages at regular or irregular intervals, compress memory pages in response to at least a threshold number of memory pages being included in the modified list, compress memory pages in response to a request from the memory manager 102, and so forth. After being compressed and added to the compressed store 110, the memory pages in the modified list 206 are moved 210 to a list of free pages, or alternatively to a standby list 212 (a list of standby pages). The memory manager 102 and/or compressed storage manager 104 have full flexibility as to whether the memory pages are moved to the list of free pages or the list of standby pages. Moving the memory pages to the free list after compression reduces double-buffering with memory of compressed and uncompressed contents, although memory pages can be put on the standby list instead and their priority may be lowered to make them more likely candidates for repurposing should memory need arise.

The compressed store manager 104 also notifies the memory manager 102 of the memory pages in the modified list 206 that the compressed storage manager 104 is compressing. The memory manager 102 avoids charging additional memory commit for the memory pages into which pages are being compressed. Effectively, the commit charge for the memory pages being compressed is transferred to the compressed store memory pages into which the memory pages are being compressed. Thus, commit charge is not maintained for both the memory pages of the program 108 and the compressed store memory pages into which the memory pages of the program 108 are compressed.

The compressed store 110 is itself made up of multiple memory pages, also referred to herein as compressed store memory pages, and these compressed store memory pages can be moved 214 to the modified list 206 as desired by the compressed store 110 or the memory manger 102. However, the compressed store memory pages do not have to be moved to the modified list for a long time (potentially indefinitely) as desired. The compressed store memory pages can remain in the working set of the compressed store.

For compressed store memory pages moved to the modified list 206, the memory manager 102 (or alternatively the compressed store manager 104) writes out 216 the compressed store memory pages to the page file 112. Thus, a memory page from the working set 202, after being compressed and stored in a compressed store memory page, can be written to the page file 112. It should be noted the compressed store manager 104 does not attempt to compress the compressed store memory pages on the modified list 206. The compressed store manager 104 can identify the memory pages it is not to attempt to compress in different manners, such as based on the process that the memory pages are allocated to (e.g., if allocated to a system process, such as the compressed store manager 104, no attempt is made to compress the memory pages), by maintaining a record of the compressed store memory pages, and so forth.

Situations can arise in which a memory page from the working set 202 that is moved to the modified list 206 cannot be compressed or otherwise added to a memory page of the compressed store 110 in an expected amount of time (e.g., within a threshold amount of time), or the system 100 chooses not to compress a memory page at all for various policy reasons. Such situations may occasionally occur, such as due to heavy memory usage in the system 100, heavy processor usage in the system 100, various policies applied to the system 100, and so forth. In such situations, the memory manager 102 writes out 218 the uncompressed memory page to the page file 112. Such memory pages are thus not included in a memory page of the compressed store 110, but the memory manager 102 maintains a record (e.g., in the page table 116) that such memory pages are available from the page file 112 rather than the compressed store manager 104.

Returning to FIG. 1, in one or more embodiments pages of the paged memory 106 each have a corresponding priority level. Only particular types of memory pages (e.g., modified pages) may have priority levels, or alternatively all types of memory pages may have priority levels. The memory manager 102 sets the priority level for each memory page, and can determine the priority level for a memory page in a variety of different manners. The priority levels can be used in various manners in the system 100. In one or more embodiments, memory pages are written to the page file 112 based on their priority level. Memory pages to be written to the page file 112 that are lower priority are written to the page file prior to memory pages that are higher priority. Similarly, in one or more embodiments memory pages are repurposed from the standby list based on their priority level.

The compressed store 110 is implemented as one or more memory pages allocated to the compressed store manager 104 by the memory manager 102. These memory pages are memory pages in user mode virtual address space of the compressed store manager 104, which provides various functionality. The memory pages implementing the compressed store 110 do not consume kernel virtual address space, and provide security to prevent data exposure because no unprivileged user mode program can access data on the memory pages. Furthermore, by using memory pages in user mode virtual address space of the compressed store manager 104, the memory manager 102 and compressed store manager 104 have control over the memory pages using existing memory manager application programming interfaces (APIs), allowing the compressed store manager 104 to control pageability of its backing data, swapping capabilities, and so forth as it desires.

In one or more embodiments, the compressed store manager 104 compresses pages of the paged memory 106 and stores the compressed pages in a region of a compressed store 110, also referred to as compressing the memory pages into the compressed store 110 or into the region of the compressed store 110. The compressed store manager 104 generates a separate compressed store 110 for (and associated with) each program 108, and adds compressed memory pages from the modified list 206 from a particular program 108 to regions of the compressed store 110 associated with the particular program. Alternatively, the compressed store manager 104 can generate and maintain compressed stores 110 at different granularities other than one compressed store 110 for each program 108 (e.g., the compressed storage manager 104 can generate and maintain compressed stores 110 for an arbitrary set of programs 108, or for all of the pageable memory in the system).

Each region of the compressed store 110 is made up of multiple memory pages of the paged memory 106 that are allocated to the compressed store manager 104 by the memory manager 102. For example, a region may be 128 kilobytes and the memory pages may each be 4 kilobytes, although these values are examples and other region and/or page sizes can alternatively be used. In one or more embodiments, pages of the paged memory 106 that are being compressed into a particular region have at least similar priority levels, and the memory pages that make up a region of the paged memory 106 have at least similar priority levels as the memory pages compressed into that region. Memory pages having at least similar priority levels refer to memory pages having the same or similar priority levels.

It should be noted that the operations discussed herein as performed by the compressed store manager 104 or a compressed store 110 can be performed by one or both of the compressed store manager 104 and a compressed store 110, that operations discussed herein as being performed by the compressed store manager 104 can alternatively be performed by a compressed store 110, and that operations discussed herein as being performed by a compressed store 110 can alternatively be performed by the compressed store manager 104. In one or more embodiments, the compressed store manager 104 is responsible for managing each compressed store 110, routing read and write requests to the appropriate compressed store 110, managing memory for the compressed store 110 (e.g., requesting memory pages be allocated to a compressed store 110), and so forth. In such situations, each compressed store 110 can simply be a set of memory pages. Alternatively, at least some of the control and logic for managing memory for a compressed store 110 (e.g., requesting a set of pages of the paged memory 106 be allocated to the compressed store 110 by the memory manager 102) can be implemented by the compressed store 110 itself. In such situations, the compressed store 110 includes one or more memory pages as well as a compressed store module to implement the control and logic for managing memory for the compressed store 110.

To create a region, the compressed store manager 104 requests a set of pages of the paged memory 106 be allocated to the manager 104 by the memory manager 102. The allocated set of pages are classified as working set pages, and the compressed store manager 104 associates the allocated set of pages with a particular compressed store 110. The compressed store manager 104 compresses memory pages on the modified list 206, and stores those compressed pages in the set of pages allocated to the compressed store manager 104.

Thus, for example, a particular set of pages is compressed into an additional set of pages. After that particular set of pages is compressed, the additional set of pages are also classified as modified pages. Thus, compressed store manager 104 compresses that particular set of pages into a different set of pages of the same type (modified). However, as the compressed store manager 104 compresses that particular set of pages, the quantity of pages in that particular set of pages is typically greater than the quantity of pages in the compressed set of pages. The compressed set of pages can then be written to the page file 112. Various different policies can be applied to determine when (or whether) the compressed set of pages are written to the page file 112.

It should be noted that in some situations the compressed memory pages are not allocated as pageable memory but as some other type of memory instead. For example, the compressed memory pages can be allocated as non-paged memory, or paged memory that is locked (so that the memory pages are not written out to the page file 112).

Figure 3:
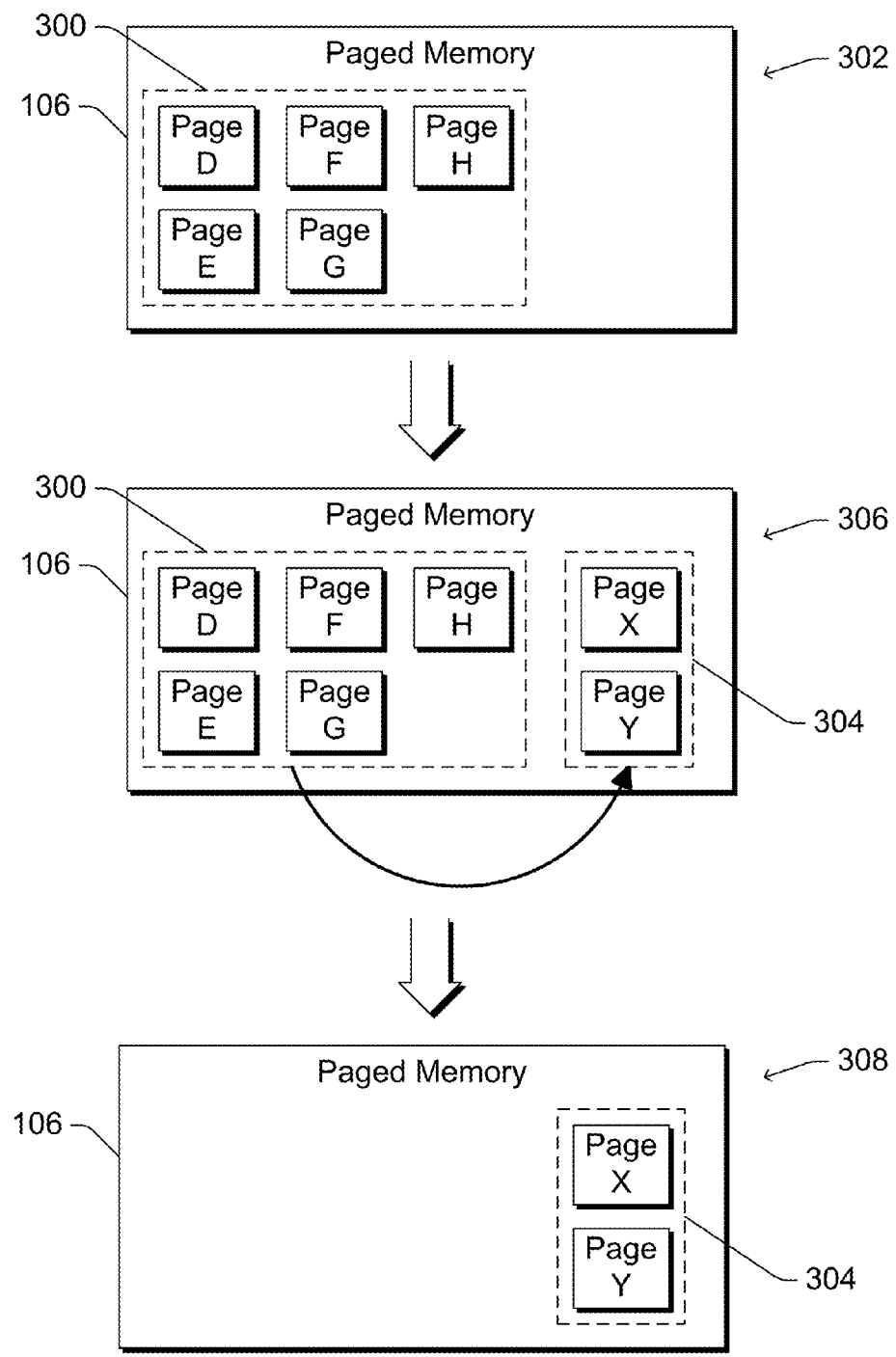
FIG. 3 illustrates an example of compressing memory pages in accordance with one or more embodiments.

FIG. 3 illustrates an example of compressing memory pages in accordance with one or more embodiments. The paged memory 106 includes five memory pages 300, as illustrated at 302. The compressed store manager 104 is allocated a region of a compressed store including two memory pages 304 (e.g., having at least similar priority levels as the memory pages 300). The compressed store manager 104 compresses the memory pages 300 into the memory pages 304, as illustrated at 306. After compression, the memory manager 102 can repurpose the memory pages 300 because the compressed version of the memory pages 300 are stored in the paged memory 106 as memory pages 304. Thus, after compression the paged memory 106 stores the memory pages 304 but need not store the memory pages 300.

Returning to FIG. 1, the system 100 also includes a virtual page file 118. Each memory page has an identifier, also referred to as a key, that allows the memory pages in the system 100 to be distinguished from one another. The memory controller 114 and the compressed store manager 104 each refer to memory pages by their identifiers. For a memory page that is to be compressed, also referred to herein as a target memory page, the memory controller 114 assigns the target memory page a page file location from the virtual page file 118. The virtual page file 118 is a group of memory locations in the memory space of the memory manager 102. The virtual page file 118 is not stored on a secondary storage device in the system 100 (contrary to the page file 112), and thus is referred to as a "virtual" page file.

The memory controller 114 assigns the target memory page to the page file location from the virtual page file 118. A page file location backed by the page file 112 is used for the page in the compressed store 110 into which the target memory page will be compressed. The compressed store manager 104, knowing that the memory page is being compressed, uses or "borrows" the commit charge for the target memory page from the program 108. The commit charge for the target memory page is not actually released from the program 108 and acquired by the compressed storage manager 104; rather, the commit charge remains with the program 108. The compressed storage manager 104 can thus be referred to as piggy-backing on the commit charge acquired by the program 108 for the target memory page to avoid acquiring its own commit charge for the target memory page. However, the compressed storage manager 104 knows that in order to access the target memory page, the target memory page will need to be decompressed, which is performed by the compressed storage manager 104. The compressed storage manager 104 can thus use the commit charge for the target memory page, but can later release the commit charge as discussed below. The commit charge for the target memory page is thus effectively transferred from a program 108 to the compressed store manager 104, and the system 100 does not use additional commit charge for compressing the target memory page.

The virtual page file 118 is a key "namespace" for memory pages that are not part of the page file 112 because that space is used by compressed modified memory pages written to the page file 112. It should be noted that the virtual page file 118 is one example of an implementation of such a key namespace, and that such a key namespace can be implemented using a variety of other tables, data structures, and so forth.

Figure 4:
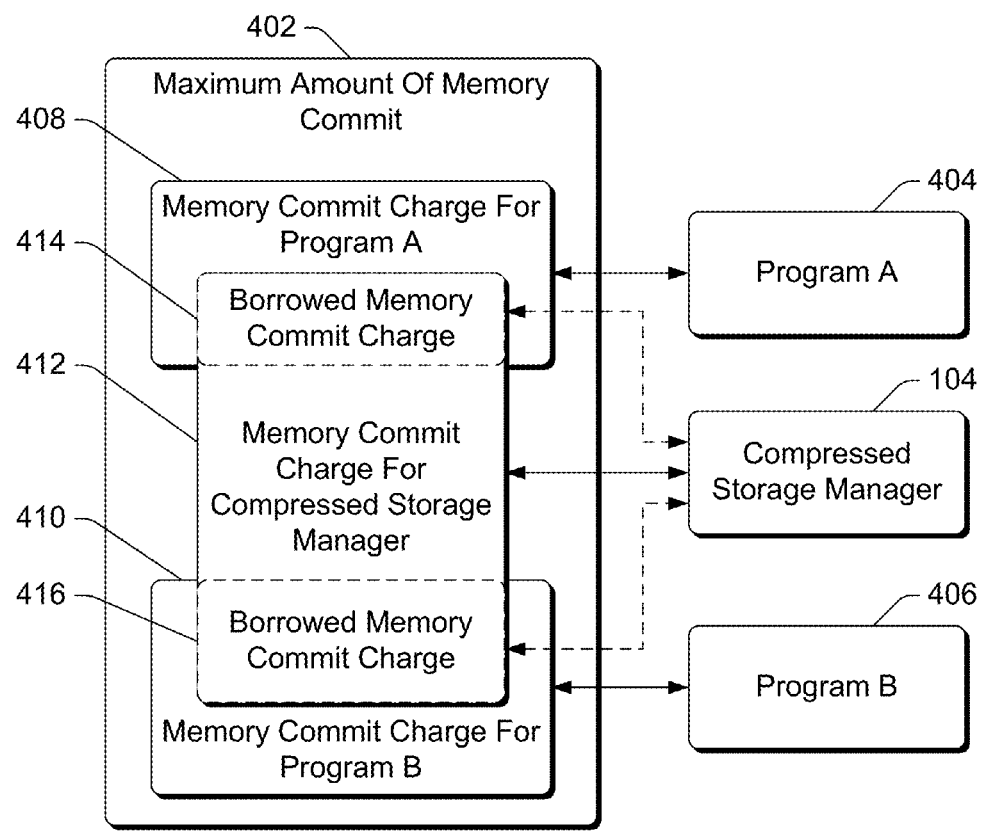
FIG. 4 illustrates an example of the use of the commit charge for one program by the compressed storage manager in accordance with one or more embodiments.

FIG. 4 illustrates an example of the use of the commit charge for one program by the compressed storage manager in accordance with one or more embodiments. FIG. 4 illustrates a maximum amount of memory commit 402 that can be charged in a system. Two programs 404 and 406 have memory commit charges 408 and 410, respectively. The compressed storage manager 104 also has a memory commit charge 412. This memory commit charge 412 includes an amount of memory used by the compressed storage manager 104 to carry out the various operations discussed herein as being performed by the compressed storage manager 104, as well as additional pre-charging of commit as discussed in more detail below. When memory pages allocated to the program 404 are compressed into a compressed store, a portion 414 of the memory commit charge 408 for the program 404 is used by the compressed storage manager 104. Similarly, when memory pages allocated to the program 406 are compressed into a compressed store, a portion 416 of the memory commit charge 410 for the program 406 is used by the compressed storage manager 104.

Returning to FIG. 1, each compressed store is made up of multiple regions, which can be the same size as a memory page or different size than a memory page. Multiple compressed memory pages can be stored in a single region. The memory manager 102 can cause the compressed store manager 104 to remove compressed pages from the compressed memory store, also referred to as evicting the compressed page from the compressed memory store. This removal can be done in response to a variety of different events, such as access to the page being requested by a program 108 (e.g., a request to read the memory page or modify the memory page), a request from the program to free the memory page, and so forth.

When a region becomes empty (all of the compressed memory pages have been removed from the region), the physical memory (e.g., RAM) or space in the page file 112 that the region consumes is freed or released by the compressed store manager 104. The freeing of physical memory or space in the page file that the region consumes refers to the memory pages that make up the region being freed (e.g., moved to the free list) or space in the page file being freed (e.g., no physical memory pages are moved to the free list because the data was in the page file and not in memory). The physical memory (e.g., RAM) or space in the page file 112 that the region consumes, which is memory that was committed to another program, can result in the system 100 being in an over-committed state. Accordingly, the memory manager 102 allows the compressed store manager 104 to free the region without the memory manager 102 needing any additional memory (since the system 100 may be in an over-committed state, the memory manager 102 may not be able to obtain additional memory if it were needed). The system 100 is thus in this over-committed state only temporarily. The memory controller 114 exposes one or more API methods that can be invoked by the compressed store manager 104, and when invoked cause the memory controller 114 to free the region without the memory controller 114 needing any additional memory.

When freeing the region of memory, the memory controller 114 does not block on needing additional memory, which refers to the memory controller 114 being able to perform the process of freeing the region without needing to allocate itself any additional memory pages. The memory controller 114 can operate in various different manners to refrain from blocking on needing additional memory. In one or more embodiments, the memory controller 114, when freeing the region of memory, does not acquire locks that would be acquired when accessing other pageable memory, does not allocate new memory, and does not access any pageable memory of the memory controller 114. The memory controller 114 also takes one or more actions to ensure that all of the necessary data structures used to map the store region memory (the memory of the compressed store 110) can be updated without faulting. In one or more embodiments, these one or more actions include locking in physical memory all page table pages mapping the store region memory, although other actions can additionally or alternatively be taken. The compressed storage manager 104 also guarantees not to operate on the same region using more than one thread to avoid needing to have the memory controller 114 acquire locks on memory pages that could interfere with the guarantee of not accessing any pageable memory of the memory controller 114.

The compressed storage manager 104 receives and processes memory page eviction requests from the memory controller 114. The compressed storage manager 104 operates so as to quickly (e.g., within a threshold amount of time) receive a memory page eviction request and begin the processing of the memory page eviction request. The processing of the memory page eviction request includes removing the compressed memory page from the compressed store (e.g., recording that the compressed memory page is no longer stored in the compressed memory store, optionally deleting the compressed memory page), and also optionally includes decompressing the compressed memory page and returning the decompressed memory page to the memory controller 104. The compressed storage manager 104 operates so that the processing of the memory page eviction request does not block on needing additional memory, which refers to the compressed storage manager 104 being able to perform the processing of the memory page eviction request without needing to have any additional memory pages allocated to the compressed storage manager 104.

As soon as the memory controller 114 communicates the memory page eviction request to the compressed storage manager 104, the memory controller 114 knows that the compressed storage manager 104 will process the memory page eviction request without blocking on needing additional memory. The memory controller 114 is thus able to use the memory commit for the evicted memory page for the program 108 from which the compressed storage manager 104 borrowed the memory commit, as the memory controller 114 knows the compressed storage manager 104 will not be requesting any additional memory pages when evicting the memory page from the compressed store.

In one or more embodiments, the compressed storage manager 104 operates so that the processing of the memory page eviction request does not block on needing additional memory by pre-allocating resources such that the compressed storage manager 104 can guarantee that at least one eviction request at a time can be processed. This pre-allocation is done prior to any compressed memory pages being stored in the compressed store (e.g., at the time the compressed store is created). The pre-allocating of resources to the compressed storage manager 104 refers to allocating sufficient memory pages for at least one eviction request to be processed, locking in physical memory any memory maps or other data structures used in processing at least on eviction request (e.g., memory map 702 of FIG. 7 and memory map 802 of FIG. 8, discussed in more detail below), and so forth.

In one or more embodiments, the compressed storage manager 104 runs as a process having a thread (e.g., referred to as a store worker thread) that does not permanently block on (wait for) any operation that may require memory pages in order to guarantee that it can process memory page eviction requests (and compaction, which in turn will produce empty regions that are released as discussed in more detail below). The store worker thread does not block on needing additional memory even if commit has been charged for those memory pages. This is because the system 100 can be in an over-commit situation at that time (which will be resolved as the store worker thread performs evictions to release region backing pages). The store worker thread optionally blocks on these operations indirectly via helper threads, but if so does this blocking with a timeout short enough to ensure that overall system forward progress processing the memory page eviction request is maintained.

Figure 5:
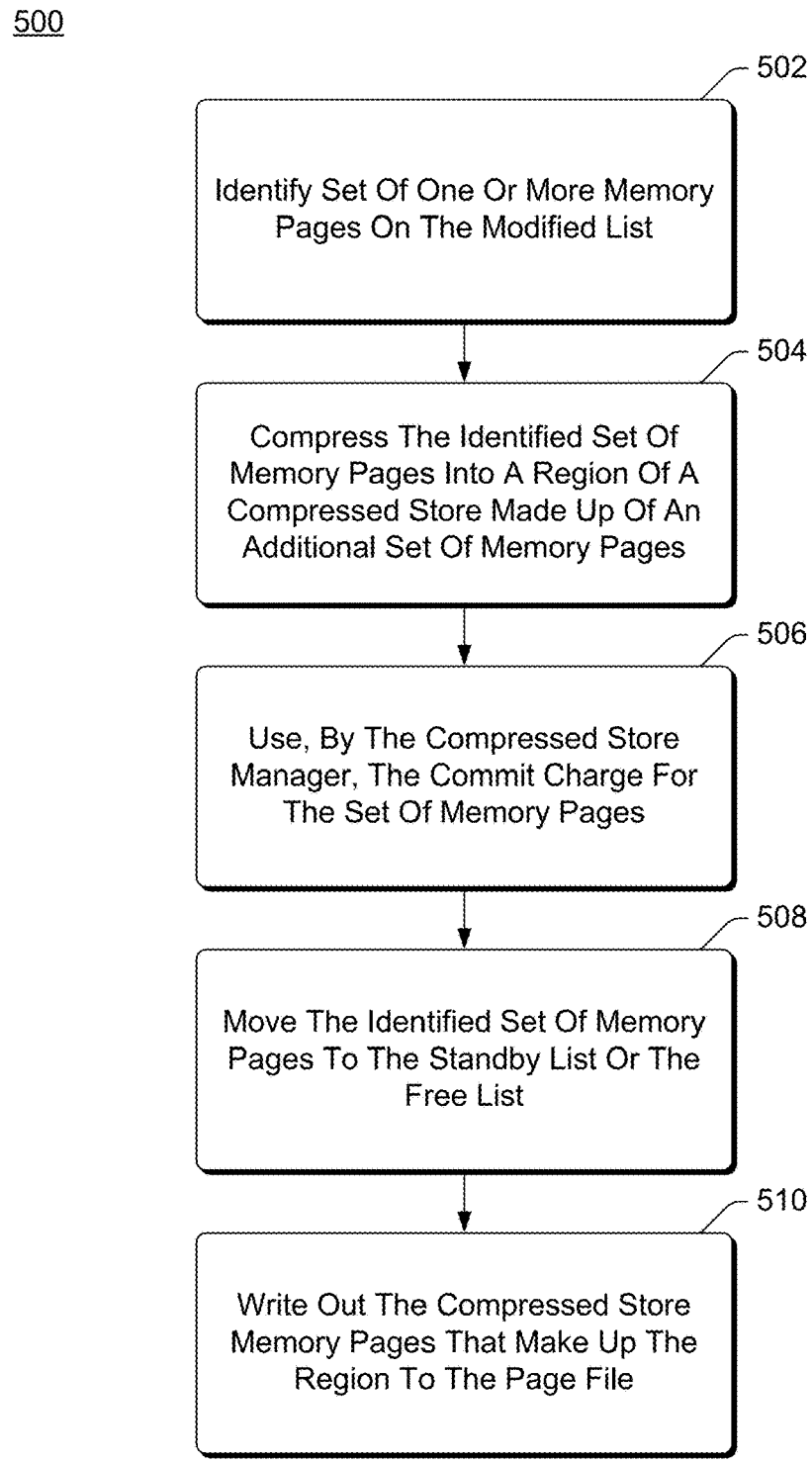
FIG. 5 is a flowchart illustrating an example process for compressing memory pages in accordance with one or more embodiments.

FIG. 5 is a flowchart illustrating an example process 500 for compressing memory pages in accordance with one or more embodiments. Process 500 is carried out by a compressed store manager, such as compressed store manager 104 of FIG. 1, and can be implemented in software, firmware, hardware, or combinations thereof. Process 500 is shown as a set of acts and is not limited to the order shown for performing the operations of the various acts. Process 500 is an example process for compressing memory pages; additional discussions of compressing memory pages are included herein with reference to different figures.

In process 500, a set of one or more memory pages on the modified list are identified (act 502). The set of one or more memory pages can be identified in various manners, such as being identified in the order the memory pages are added to the modified list, based on priority levels of pages (e.g., lower priority pages being identified before higher priority pages), and so forth.

The set of memory pages identified in act 502 are compressed into a region of a compressed store of the paged memory (act 504). As part of the compressing in act 504, the compressed store manager maintains a record of where in the region the compressed version of each memory page of the set of memory pages is stored. This record can take various forms, such as for each compressed version of a memory page a record of which one or more compressed store memory pages store the compressed version of the memory page, for each compressed version of a memory page a record of an address range in the region that stores the compressed version of the memory page, and so forth.

Compressing a memory page refers to compressing the content of (e.g., data stored in) the memory page. Any of a variety of different public and/or proprietary compression techniques can be used to compress a memory page. For example, a memory page can be compressed using run-length encoding compression algorithms, LZW compression algorithms, Huffman coding algorithms, and so forth. Multiple different compression algorithms can optionally be employed, such as different compression algorithms for different types of content. For example, one compression algorithm may be used for alphanumeric and/or text content, another compression algorithm may be used for image content, and another compression algorithm may be used for audio content. The compression technique used to compress a memory page is typically a lossless compression algorithm, although in certain circumstances (e.g., for certain image and/or audio content) a lossy compression algorithm may alternatively be used. The particular compression algorithm may also be device dependent, where a faster device (e.g., with a more powerful one or more processors) may be configured with a more processor-intensive compression algorithm that compresses better whereas a slower device (e.g., with a less powerful one or more processors) may be configured with a less processor-intensive algorithm that does not compress as well. The particular compression algorithm may also be based on a tradeoff with the storage device performance. If the CPU outperforms the storage device by a large margin, then a more processor-intensive compression algorithm that compresses better (and thus results in less storage device I/O) can be used.

In one or more embodiments, the memory pages are compressed in act 504 individually. Alternatively, two or more memory pages can be compressed together (e.g., a compression algorithm can be run on two or more memory pages together rather than individually).

Additional processing of the set of memory pages can also optionally be performed in act 504. This additional processing can be encrypting the content of the set of memory pages (e.g., using symmetric key encryption, public key encryption, and so forth), generating error-detecting data such as CRC (cyclic redundancy check) data for the set of memory pages, generating authentication information such as HMAC (Hash Message Authentication Code) data for the set of memory pages, and so forth.

The commit charge for the set of memory pages identified in act 502 is used by the compressed store manager (act 506). The compressed store manager can use or "borrow" the commit charge for the target memory page because the compressed store manager knows that the memory page is being compressed as discussed above.

The set of memory pages identified in act 502 are moved to the standby list (act 508) after being compressed into the compressed store, or alternatively to the free list. The set of memory pages can be moved to the standby list (or free list) in various manners, such as in response to the compressed store manager 104 notifying the memory manager 102 that the set of memory pages can be freed. The set of memory pages identified in act 502 can be moved to the standby list (or free list) and repurposed because two versions of the same memory page (one version being uncompressed and one version being compressed) need not be kept in paged memory as it may not be an efficient use of paged memory.

The compressed store memory pages that make up the region of the compressed store are written out to the page file by the memory manager (act 510). It should be noted that the compressed store memory pages need not be written to the page file immediately. Rather, writing out of the compressed store memory pages can be delayed until a later time, such as a time when the memory manager 102 desires to free memory pages for allocation to another program 108, a time when the compressed store manager 104 desires to write the compressed store memory pages, and so forth. It should also be noted that any number of techniques can be implemented to improve the speed, efficiency, and so forth of writing the compressed store memory pages to the page file (e.g., the compressed store memory pages can be written in contiguous chunks, etc.).

It should further be noted that the compressed store memory pages are written to the page file 510 rather than writing out the set of memory pages identified in act 502 to the page file. Thus, compressed versions of the set of memory pages identified in act 502 are written to the page file without (or in the absence of) writing out the decompressed versions of the set of memory pages to the page file.

Once compressed store memory pages that make up the region are written to the page file, the compressed store memory pages are placed on the standby list. At this point, the compressed store memory pages are treated as available memory in the system 100 and can be repurposed at any time as desired by the memory manager 102.

In one or more embodiments, the compressed store manager does not allow the memory manager to write out a compressed store memory page until the compressed store memory page is substantially filled. A compressed store memory page being substantially filled refers to little if any storage space remaining in the memory page into which additional compressed memory pages could be stored. For example, at least a threshold amount of the storage space of the compressed store memory page has been used to store the compressed memory pages.

It should be noted that although some of the discussions herein refer to compressing memory pages of one or more processes, the techniques discussed herein analogously apply to compressing memory pages for all pageable memory, which can include user mode paged memory and kernel mode paged memory. In such situations the entire page file is represented by the memory in the compressed store, and the compressed store essentially manages the page file as all modified pages go through the compressed store.

Figure 6:
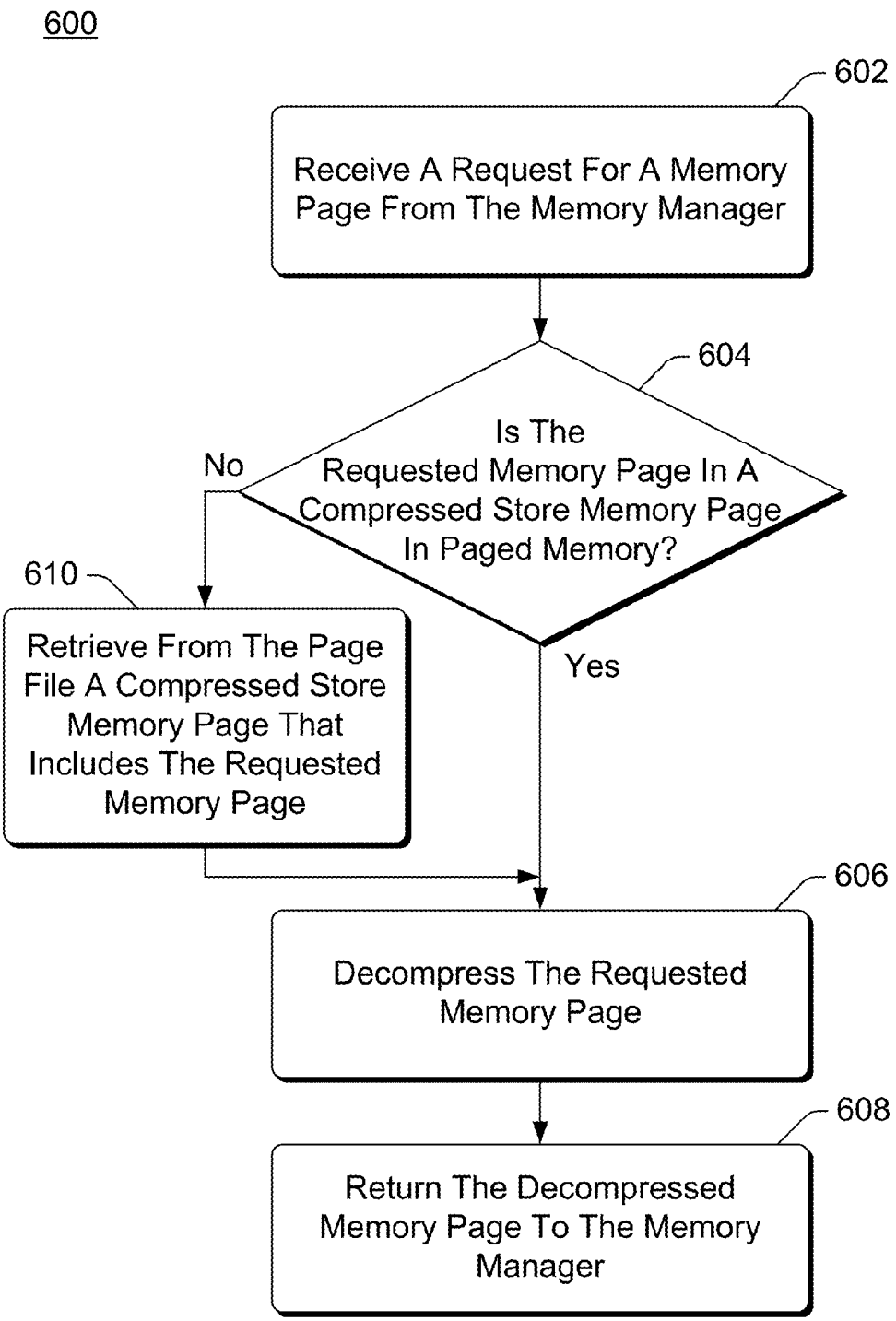
FIG. 6 is a flowchart illustrating an example process for retrieving compressed memory pages in accordance with one or more embodiments.

FIG. 6 is a flowchart illustrating an example process 600 for retrieving compressed memory pages in accordance with one or more embodiments. Process 600 is carried out by a compressed store manager, such as compressed store manager 104 of FIG. 1, and can be implemented in software, firmware, hardware, or combinations thereof. Process 600 is shown as a set of acts and is not limited to the order shown for performing the operations of the various acts. Process 600 is an example process for retrieving compressed memory pages; additional discussions of retrieving compressed memory pages are included herein with reference to different figures.

A request for a memory page is received from the memory manager (act 602). This request can be, for example, in response to a request from a program 108 requesting access to content in a memory page after at least one memory page was compressed into a compressed store 110. The request includes an identifier of at least one memory page, also referred to as a key. The memory manager can request a single memory page or multiple memory pages.

In response to the request, a check is made as to whether the requested memory page is in a compressed store memory page in paged memory (act 604). As discussed above, the compressed store memory pages need not be immediately written out to the page file 112, so the requested memory page may still be available in a compressed store memory page of the paged memory 106. It should be noted that the compressed store memory page may be in a working set of the compressed store manager 104 or on various lists (e.g., a modified list or a standby list), but still be in paged memory.

If the requested memory page is in a compressed store in paged memory, then the requested memory page is decompressed (act 606) and returned to the memory manager (act 608). After being decompressed and returned, the compressed memory page is deleted from the region of the compressed store 110, thus avoiding duplication of the memory page between the uncompressed and compressed forms of the memory page. After the contents of a compressed store memory page have been decompressed and returned, the compressed store memory page can be repurposed or freed.

The manner in which the requested memory page is decompressed can vary based at least in part on the technique used to compress the requested memory page. Any other processing performed on the memory page is also verified or undone in act 606, such as decrypting the memory page, verifying error-detecting data, verifying authentication information, correcting data (if possible) if this verification fails, and so forth. If error-detecting data or authentication information cannot be verified and/or the data corrected, then an indication that the requested memory page is corrupted can be returned to the memory manager rather than the decompressed requested memory page.

If the requested memory page is not in a compressed store in paged memory, then a compressed store memory page that includes the requested memory page is retrieved from the page file (act 610). Retrieving a compressed store memory page includes reading the compressed store memory page from the page file and storing the compressed store memory page into a compressed store 110 of the paged memory 106. The requested memory page is then in a compressed store 110 in paged memory, so the requested memory page is decompressed (act 606) and returned to the memory manager (act 608).

It should be noted that the acts 604 and 610 can be performed together. For example, the compressed store manager 104 maintains a record of which memory pages are compressed into which compressed store memory pages. In response to the request in act 602, the compressed store manager 104 reads the compressed store memory page in which the requested memory page is compressed. If the compressed store memory page is in the compressed store 110 of the paged memory 106, then the compressed storage manager 104 reads the compressed store memory page from paged memory 106. If the compressed store memory page is not in the compressed store 110 of the paged memory 106, then a page fault occurs, the memory manager 102 retrieves the compressed store memory page from the page file and places the compressed store memory page into the paged memory 106, then the compressed storage manager reads the compressed store memory page from paged memory 106.

It should also be noted that the compressed storage manager 104 can optionally choose to decompress and return (and retrieve from the page file if need be) one or more memory pages in addition to a requested memory page. For example, the compressed storage manager 104 can choose to decompress and return one or more memory pages nearby (e.g., within a threshold address range) of a requested memory page in an attempt to increase performance by reducing future memory manager requests for memory pages.

It should further be noted that, with the compressing of memory pages and retrieval of memory pages discussed herein, the compressed store manager 104 operates to guarantee forward progress of the write (compression) or read (retrieval) request from the memory manager. The forward progress guaranteed by the compressed store manager 104 refers to preventing deadlocks in the system 100 because no memory pages are available at least in part due to the compression of memory pages. The compressed store manager 104 operates to guarantee this forward progress regardless of whether a requested memory page has already been compressed and stored in the page file 112 and regardless of whether a requested memory page has been repurposed after being compressed and stored in the page file 112. In one or more embodiments, forward progress for compressing memory pages is guaranteed by informing the memory manager to write one or more uncompressed memory pages on the modified list to the page file, thereby freeing one or more memory pages. Forward progress for retrieving memory pages is guaranteed by pre-allocating the necessary resources (e.g., one or more memory pages in the working set of the compressed storage manager) up-front to ensure that at least one such read will always have the needed resources to proceed.

Returning to FIG. 1, each memory page has an identifier (a key) associated with it that allows the memory pages to be distinguished from one another. This identifier can be assigned by any of various components, such as the memory manager 102 or the compressed store manager 104. The compressed version of a memory page takes up less space in the paged memory 106 than the memory page itself, so the same data unit structure is not used by compressed store manager 104. For example, the memory manager 102 may manage paged memory 106 by memory pages, but compressed store manager 104 would not.

Figure 7:
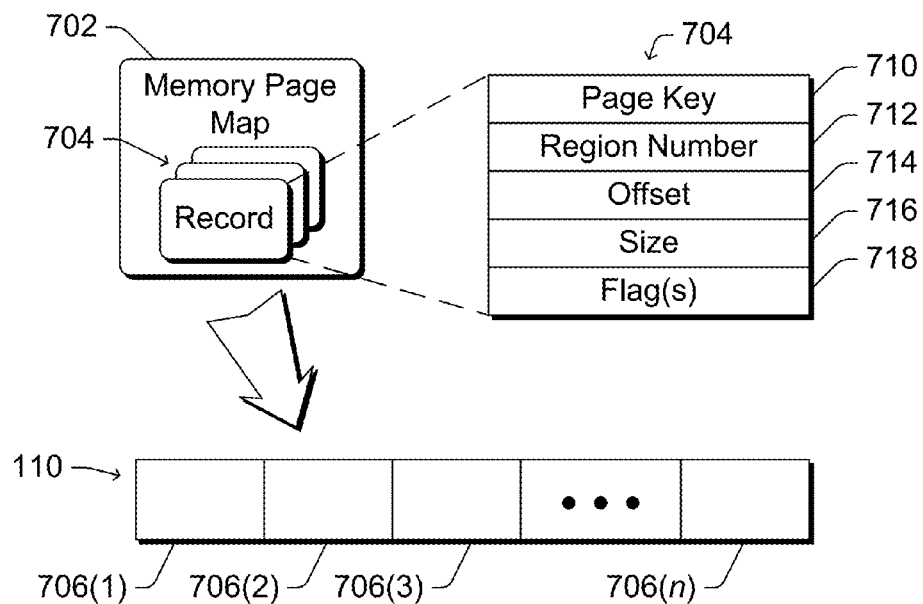
FIG. 7 illustrates an example memory page map in accordance with one or more embodiments.

The compressed store manager 104 maintains a memory page map to identify in which regions of compressed stores 110 the various compressed memory pages are stored. FIG. 7 illustrates an example memory page map 702 in accordance with one or more embodiments. For each memory page compressed into the compressed store 110, the memory page map 702 maintains a corresponding record 704 identifying where that compressed memory page is stored in the regions of memory pages. The compressed store 110 is illustrated as one or more (n) different regions 706(1), . . . , 706(n), each of which is itself made up of multiple memory pages as discussed above. In one or more embodiments, a separate memory page map is maintained for each compressed store 110 in paged memory 106. Alternatively, memory page maps for multiple compressed stores can be combined into a single memory page map, and the record 704 can include an identifier of the compressed store 110 in which the compressed memory page is stored.

Each record 704 includes a page key field 710, a region number field 712, an offset field 714, a size field 716, and a flag(s) field 718. The page key field 710 stores the identifier of the corresponding compressed memory page. This identifier can take any of a variety of different forms. For example, it could be a process identifier and virtual address, a record identifier, and so forth. The page key field 710 includes the identifier of the location in the virtual page file 118 to which the memory page is assigned during compression of the memory page, as discussed above.

The region number field 712 stores an identifier of the particular region 706 in which the corresponding compressed memory page is stored. Although typically a number, this region could be identified in any of a variety of other manners. The offset field 714 stores an identifier of an offset into the particular region 706 where storage of the data for the corresponding compressed memory page begins. Alternatively, rather than region and offset identifiers, one or more fields storing any other identifier(s) of the location in the compressed portion where the corresponding compressed memory page is stored could be used.

The size field 716 stores an identifier of the size (e.g., in bytes) of the corresponding compressed memory page. Given the region, the offset into the particular region, and the size of the compressed memory page, a memory address range at which the compressed memory page is stored can be readily identified. The flag(s) field 718 stores various state information regarding the corresponding compressed memory page. Examples of such flags include a selection priority for the memory page used to determine which memory pages are selected to be compressed, a priority level corresponding to the memory page, and so forth.

It is to be appreciated that the memory page map 702 is only an example. In other embodiments, additional fields can be included in each record of the map 702. For example, error-detecting data such as CRC data, authentication information such as HMAC data, information describing the use history and/or frequency of the memory page, and so forth can be included in each record of the map 702. Furthermore, one or more of the fields 710-718 can be omitted from the records of the map 702. Additionally, it should be noted that the data in one or more of the fields 710-718 can be stored with the memory page in paged memory 106 rather than in a separate record.

In addition to the memory page map 702, the compressed store manager 104 also maintains a region map to identify what memory page is stored in a particular location of a region. Thus, the memory page map 702 operates to identify where an identified compressed memory page is stored, whereas the region map operates to identify which compressed memory page is stored in a given location of a region.

Figure 8:
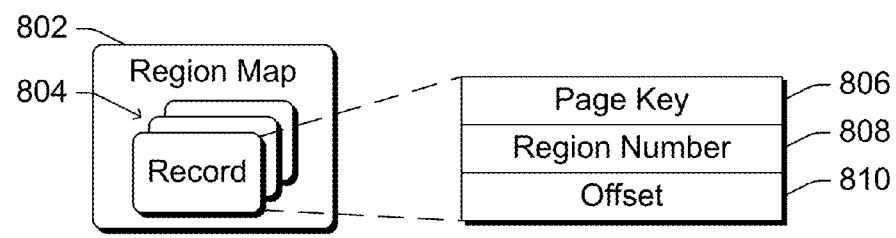
FIG. 8 illustrates an example region map in accordance with one or more embodiments.

FIG. 8 illustrates an example region map 802 in accordance with one or more embodiments. For each offset into a region where a different memory page is stored, the region map 802 maintains a record 804 identifying the corresponding compressed memory page stored at that offset. Each record 804 includes a page key field 806, a region number field 808, and an offset field 810.

The page key field 806 stores the identifier of the corresponding compressed memory page, analogous to page key field 710 of record 704 of FIG. 7. The page key field 806 includes the identifier of the location in the virtual page file 118 to which the memory page is assigned during compression of the memory page, as discussed above. The region number field 808 stores an identifier of the particular region 706 in which the corresponding compressed memory page is stored, analogous to the region number field 712 of record 704. The offset field 810 stores an identifier of an offset into the particular region 706 where storage of the data for the corresponding compressed memory page begins, analogous to the offset field 714 of record 704. Alternatively, rather than region and offset identifiers, one or more fields storing any other identifier(s) of the location in the compressed portion where the corresponding compressed memory page is stored could be used.

It is to be appreciated that the region map 802 is only an example. In other embodiments, additional fields can be included in each record of the map 802, and/or one or more of the fields 806-810 can be omitted from the records of the map 802. Additionally, it should be noted that the data in one or more of the fields 806-810 can be stored with the memory page in paged memory 106 of FIG. 1 rather than in a separate record.

The memory page map 702 of FIG. 7 and the region map 802 of FIG. 8 can be implemented in any of a variety of different manners. In one or more embodiments, these maps are each implemented as a B+-tree for increased performance in accessing the individual records. Alternatively, any of a variety of other conventional data structures can be used to implement these maps, such as AVL trees, hash table, arrays, and so forth.

Returning to FIG. 1, the compressed store manager 104 also compacts the regions storing compressed memory pages in the compressed store 110. Over time, memory pages that were compressed and stored in a region can be removed from the region. Such removals or evictions can occur for a variety of reasons as discussed above.

Removal of compressed memory pages from a region results in empty gaps or blocks within the memory pages of the regions storing compressed memory pages. During the compaction process, the compressed store manager 104 consolidates the remaining compressed memory pages so that these empty gaps or blocks are filled.

In one or more embodiments, the compressed store manager 104 keeps track of how well the regions are being utilized. A value representing how well the regions are being utilized is determined based on how much data is stored in the memory pages of the regions (e.g., the summation of the sizes of all the compressed memory pages stored in the memory pages of the region) and the current size of the region (the summation of the sizes of the memory pages of the region that are still available). If the difference or ratio of these two values exceeds a threshold value, then the compressed store manager 104 determines that compaction should be performed. This compaction threshold value can be a fixed or variable amount, 10% of the current size of the region, zero, and so forth. In other embodiments, compaction is performed whenever there are any empty gaps or blocks in any of the memory pages of the regions.

Compaction is performed by relocating compressed memory pages from one region to another location within the same region or different region. The size of the various compressed memory pages in each memory page can be readily determined by accessing the data structures used by the compressed storage manager 104 (e.g., as discussed above with respect to FIG. 7). In one or more embodiments, compressed memory pages within a particular region are compacted together (e.g., at the beginning or ending of the region) so that all of the empty gaps in that region are together. This can result in a larger gap in a region rather than several smaller gaps, and allow for a larger compressed memory page to be relocated within that region. Alternatively, such intra-region compaction may not be performed, and compressed memory pages may simply be relocated into the existing gaps in regions, or the compressed memory pages may be relocated to a different region.

Compaction can result in the compressed memory pages from a region(s) being relocated to one or more other regions, and thus emptying the memory pages of a region. Once a memory page of a region is emptied, the compressed store manager 104 can compress and store additional memory pages into that memory page, or release that memory page to the memory manager 102 (e.g., freeing that memory page).

The determination of which compressed memory pages are to be relocated into which regions can be made in any of a variety of manners. For example, compressed memory pages from the region having the most empty gaps (and thus the smallest amount of data in its memory pages) can be selected for relocation first as the compressed store manager 104 is more likely to be able to relocate all the compressed memory pages from that region into other regions. By way of another example, larger compressed memory pages may be selected first to avoid filling larger gaps with smaller compressed memory pages. By way of another example, the compressed memory pages may be selected for relocation so as to reduce the amount of copying from one region to another. By way of yet another example, the age of regions may be taken into account in determining which compressed memory pages are to be relocated. The age of a compressed memory page refers to an amount of time that the compressed memory page has been compressed and stored in a region. The age of a region refers to, for example, the average, maximum, and/or minimum age of the compressed memory pages in that region.

The threshold value for compaction can be a fixed amount (e.g., no more than 25% of the current size of a region should be empty gaps), or alternatively can be a dynamic amount. This dynamic amount can vary based on different criteria, such as the compressibility of compressed memory pages stored in the regions (e.g., better compressibility of compressed memory pages could increase the empty gaps permitted in the regions), the resource pressure in the system 100 (e.g., higher pressure could reduce the empty gaps permitted in the regions), and so forth. Various other criteria regarding a current state of the system 100 can also be used in varying the threshold value for compaction, such as hit rates (e.g., how frequently memory pages in the region are accessed), time of day or other user context (e.g., early morning, during lunch, after lunch, etc.), battery life, and so forth. For example, if processor usage is very high, the empty gaps permitted in the regions can be increased in order to reduce the burden of the processor in relocating memory pages. By way of another example, if the power state in the system 100 indicates that power should be conserved, or if the battery level is low, then the empty gaps permitted in the regions can be increased in order to reduce the power consumption of the processor by requiring fewer compressed memory pages to be relocated.

The compressed store manager 104 can determine whether to compact regions at different times. For example, the compressed store manager 104 may make the determination at regular or irregular intervals. By way of another example, the compressed store manager 104 may make the determination in response to different events in the system 100, such as the processor being idle for a threshold amount of time, an indication that resource pressure in the system 100 is increasing, and so forth.

The compressed storage manager 104 operates so that the process of compacting regions does not block on needing additional memory, which refers to the compressed storage manager 104 being able to perform the process of compacting regions without needing allocation of any additional memory pages. Compacting regions involves accessing two regions at the same time—reading compressed memory pages from one region and writing the read compressed memory pages into a second region. In one or more embodiments, the compressed storage manager 104 operates so that the process of compacting regions does not block on needing additional memory by pre-charging any resources needed by the compressed storage manager 104 in order to be able to access a number of regions needed to perform compaction (e.g., two regions) without needing allocation of any additional memory pages. This pre-charging is done prior to any compressed memory pages being stored in the compressed store (e.g., at the time the compressed store is created). Thus, the compressed storage manager 104 guarantees or ensures that compaction can make forward progress.

The resources that are pre-charged by the compressed storage manager 104 can vary based on the manner in which the system 100 is implemented. In one or more embodiments, the resources that are pre-charged are a commit charge for two regions' worth of memory pages. As discussed above, a region may be made up of multiple memory pages, for example 32 memory pages. Thus, the resources that are pre-charging are a commit charge for 64 memory pages (32 memory pages for each of the two regions). Various other resources can also be pre-charged, such as memory page locks (e.g., the system 100 may have a limit (e.g., referred to as resident available) on how many memory pages can be locked at any given time), and a number of memory page locks for two regions' worth of memory pages towards that limit are pre-acquired.

In one or more embodiments, these pre-charged resources for two regions are charged globally for all compressed stores to share for forward progress purposes. However, only one store can be the forward progress owner of the two regions (two compressed stores cannot each take one of the two regions). Sharing the pre-charged resources this way reduces the fixed cost of each compressed store. However, forward progress is still guaranteed because each compressed store's compaction is guaranteed to make forward progress once ownership of the pre-charged resources is taken because that ownership is eventually released and another compressed store can acquire it to proceed with its compaction.

In one or more embodiments, the compressed storage manager 104 runs as a process having a thread (e.g., referred to as a region lock helper thread) that performs the copying of data between regions. The region lock helper thread may need additional memory pages and may fault on memory pages (causing the memory pages to be brought into physical memory from the page file 112), which can be performed because the resources (including commit charge for memory pages) have been pre-acquired for compressed storage manager 104. It should be noted that the region lock helper thread is different from the store worker thread of the compressed storage manager 104 discussed above (the store worker thread does not block on needing memory pages as discussed above, whereas the region lock helper thread can block on needing memory pages).

Additionally, the memory manager 102 exposes one or more API methods that can be invoked by the compressed store manager 104, and when invoked cause the memory manager 102 to use the memory page locks pre-charged by the compressed storage manager 104. In response to a memory page lock request by the compressed storage manager 104, the memory manager 102 locks the requested memory page and charges that memory page lock against the memory page locks pre-charged by the compressed storage manager 104, and further causes any other process that may request memory pages locks for those same memory pages to acquire their own memory page lock charges (which may or may not be available at the time). In response to a memory page lock release request by the compressed storage manager 104, the memory manager 102 releases the lock on the memory page that was placed due to the memory page lock request by the compressed storage manager 104 (although the memory page may remain locked by other processes), and returns the memory page lock as one of the pre-charged memory page locks for the compressed storage manager 104. By requiring such other processes to obtain their own memory page locks, the situation where the compressed storage manager 104 desires to release the lock on a memory page but another process also has a lock on the memory page but has not released the memory page lock is avoided. This allows the compressed storage manager 104 to continue compacting regions, locking and unlocking memory pages for the regions as appropriate because the memory locks have been pre-charged by the compressed storage manager 104.

Additionally, the compressed storage manager 104 allows an arbitrary number of processes (or process threads) to read from the regions of the compressed store concurrently, and ensures that at least one region can always be read. This assurance can be provided in different manners. In one or more embodiments, this assurance is provided by attempting, in order to read a region by a thread, to charge memory commit for the entire region (e.g., 32 memory pages of commit are charged for a region that is made up of 32 memory pages) prior to initiating the read. This attempt is made because while a read is outstanding on the region, the region is busy and cannot be compacted or have its memory pages released (because any number of threads can be reading/decompressing from it at that time). If the attempt is successful, the memory commit for the region is charged and the read can continue. However, if the attempt is unsuccessful (e.g., because the system 100 is at its commit limit), then the compressed storage manager 104 queues the read request and uses a pre-reserved commit charge for one region's worth of memory pages. This pre-reserved commit charge is used by the compressed storage manager 104 only for read requests, allowing the compressed storage manager 104 to ensure that one region can always be read. The use of this pre-reserved commit charge allows the memory commit charge for another thread reading a region to fail while still allowing reading of the compressed store to make forward progress.

In one or more embodiments, the compressed storage manager 104 runs as a process having a thread (e.g., referred to as a read helper thread). A commit charge for one region's worth of memory pages is pre-reserved for the read helper thread, and this commit charge is not released. The read helper thread can thus be relied on to have commit charge to read a region of memory even if the system 100 is at its memory commit limit. Read requests are queued to the read helper thread, and these read requests are serialized (performed sequentially, one by one), with the read helper thread using its pre-reserved commit charge against which the memory commit to read each region is charged. The compressed storage manager 104 also ensures that when memory commit for a region is charged to the read helper thread, other threads cannot piggyback on the pre-reserved charge. Any such other threads must acquire their own memory commit charge, and if the other threads are unable to do so their reads are queued to the read helper thread.

The compressed storage manager 104 may have multiple reader helper threads, one for each compressed store. The pre-reserved commit charge for one region is acquired globally for these multiple read helper threads to share. This ensures that at least one read helper thread is making forward progress on the system and that one read helper thread is guaranteed to finish and release the pre-reserved commit charge to allow another read helper thread to proceed.

Additionally, in one or more embodiments the compressed storage manager 104 pre-charges at least one region's worth of memory commit (optionally one region's worth of memory commit per commit store 110). As discussed above, multiple memory pages can be compressed into a single region. This can result in situations, for example, where a single region has been created but a small number (less than the number of memory pages that make up the region) of memory pages have been compressed and stored in the region. Given the small number of compressed memory pages stored in the region, there is insufficient memory commit for the compressed storage manager 104 to use. By pre-charging one region's worth of memory commit (e.g., 32 pages of memory commit if the region is made up of 32 memory pages), the compressed storage manager 104 can ensure that there is sufficient memory commit for the entire region, and allows a region's worth of memory pages to be read, modified, or freed without having any memory pages of the physical memory or page file 112 that back the region released. Until a region's worth of memory pages are evicted from the compressed store, the compressed storage manager 104 will not release any of the memory pages of the physical memory or page file 112 that back the region, and this pre-charged one region's worth of memory commit provides a buffer for such situations. Compaction making forward progress as discussed above ensures that only one such region pre-charging is needed since compaction will ensure only one region is not completely full.

Multiple regions' worth of memory commit can be pre-charged by the compressed storage manager 104, although pre-charging a single region's worth of memory commit is sufficient. Pre-charging a single region's worth of memory commit is sufficient because if pages don't compress, then evicting a region's worth of pages (via reading and modifying them or freeing them) will create a hole in the regions big enough to create an empty region and release its pages (after compaction). However, if pages compress, then evicting a region's worth of pages may not vacate an entire region but that means the store generated free memory for which the memory commit limit has not been increased so no new page file backed memory pages can be created to consume those pages. Page file pages can consume them and those will not have forward progress issues (due to the compressed store) for being written out. So, whatever free pages compression generates end up adding to the buffer.

The techniques discussed herein support various usage scenarios. The techniques discussed herein conserve memory commit in a computing device by reducing the amount of physical memory programs use by compressing that memory, and reducing (virtually eliminating) the commit cost of compressing the memory. This increases the number of programs that can be run in a computing device at any given time without having to terminate the programs. This also decreases the amount of paged memory and/or storage device space (for the page file) needed to allow a given number of programs to be run in a computing device at any given time without having to terminate any of the programs.

Having an insufficient amount of memory commit results in programs not being able to launch because there is no more memory commit, or increasing the size of the page file to allow the programs to launch. However, growing the page file increases use of the storage device space, which can be problematic due to the limited size of the storage device. The techniques discussed herein reduce the memory commit charged when compressing memory pages allocated to a program, thus allowing more memory commit to be available to other programs without growing the size of the page file.

Reducing the memory commit charged when compressing memory pages in a computing device improves the performance of the computing device because the maximum amount of commit charge permissible in the computing device (the commit limit for the computing device) is equal to the amount of physical memory (e.g., RAM) plus the size of all page files on a storage device that backs the physical memory. By reducing the charged memory commit, the page file size can be reduced (or does not have to be increased to allow for the additional memory commit that would be needed for compression). Reducing the page file size in-turn saves disk space on the computing device. Disk space can be a very important commodity, especially on cheaper computing devices trying to reduce cost. So, by using the techniques discussed herein, the physical memory savings of compression are obtained without needing to pay the expense of consuming more disk space for the page file (which in-turn would leave less space for the user to store their files leading to less satisfaction with their computing device).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
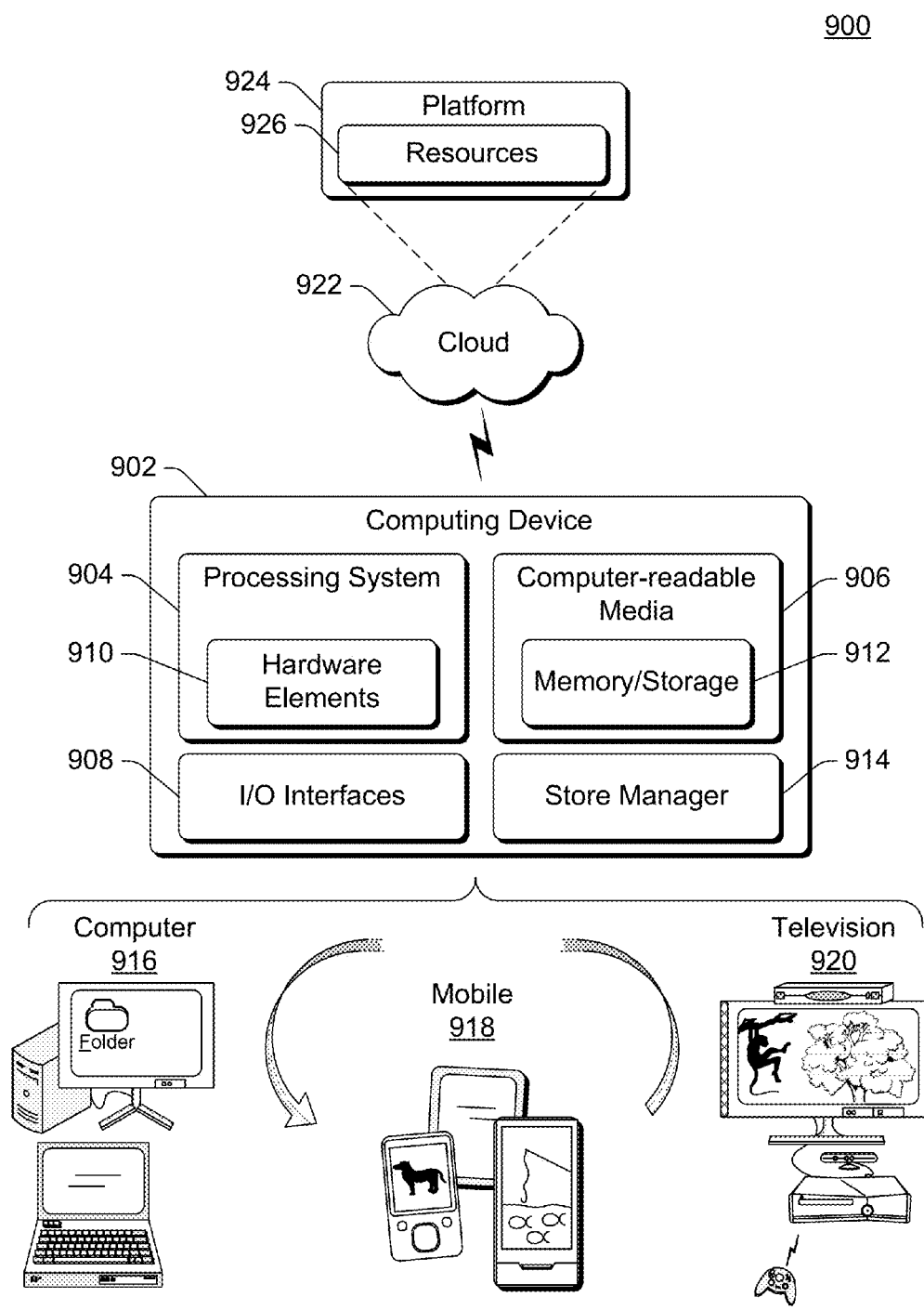
FIG. 9 illustrates an example system generally that includes an example computing device that is representative of one or more systems and/or devices that may implement the various techniques described herein.

FIG. 9 illustrates an example system generally at 900 that includes an example computing device 902 that is representative of one or more systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Computing device 902 also includes a store manager 914. Store manager 914 provides various memory compression functionality as discussed above. Store manager 914 can implement, for example, the compressed store manager 104 of FIG. 1. Although illustrated as separate from the computer-readable media 906, it should be noted that the store manager 914 can alternatively be implemented as part of the computer-readable media 906.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 902 may assume a variety of different configurations, such as for computer 916, mobile 918, and television 920 uses. Each of these configurations includes devices that may have generally different constructs and capabilities, and thus the computing device 902 may be configured according to one or more of the different device classes. For instance, the computing device 902 may be implemented as the computer 916 class of a device that includes a personal computer, desktop computer, a multi-screen computer, laptop computer, netbook, and so on.

The computing device 902 may also be implemented as the mobile 918 class of device that includes mobile devices, such as a mobile phone, portable music player, portable gaming device, a tablet computer, a multi-screen computer, and so on. The computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 922 via a platform 924 as described below.

The cloud 922 includes and/or is representative of a platform 924 for resources 926. The platform 924 abstracts underlying functionality of hardware (e.g., servers) and software resources of the cloud 922. The resources 926 may include applications and/or data that can be utilized while computer processing is executed on servers that are remote from the computing device 902. Resources 926 can also include services provided over the Internet and/or through a subscriber network, such as a cellular or Wi-Fi network.

The platform 924 may abstract resources and functions to connect the computing device 902 with other computing devices. The platform 924 may also serve to abstract scaling of resources to provide a corresponding level of scale to encountered demand for the resources 926 that are implemented via the platform 924. Accordingly, in an interconnected device embodiment, implementation of functionality described herein may be distributed throughout the system 900. For example, the functionality may be implemented in part on the computing device 902 as well as via the platform 924 that abstracts the functionality of the cloud 922.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: identifying a first set of memory pages that have been allocated to a program in a computing device and that have been modified, memory commit for the first set of memory pages having been charged to the program; compressing the first set of memory pages into a compressed store that is made up of a second set of memory pages and is managed by a compressed store manager; using, by the compressed store manager, the memory commit charge for the first set of memory pages, effective to conserve memory commit in the computing device; and allowing a memory manager to repurpose the first set of memory pages after the first set of memory pages has been compressed into the compressed store.

Alternatively or in addition to any of the above described methods, any one or combination of: the compressed store including a set of multiple regions, each region including a subset of the second set of memory pages, and the method further comprising freeing, in response to one of the multiple regions becoming empty, the one region without needing additional memory pages allocated to the compressed storage manager; the compressed storage manager pre-allocating resources, prior to any compressed memory pages being stored in the compressed store, to allow at least one eviction request at a time to be processed by the compressed storage manager, each eviction request comprising a request to remove a compressed memory page from the compressed store; the method further comprising the compressed storage manager processing the at least one eviction request without blocking permanently on any operation that requires one or more additional memory pages to be allocated to the compressed storage manager; the compressed store including a set of multiple regions, each region including a subset of the second set of memory pages, and the method further comprising compacting one of the multiple regions to fill empty gaps in the one region, the compacting being performed by the compressed storage manager without needing allocation of any additional memory pages to the compressed storage manager; the compressed storage manager guaranteeing that the compacting makes forward progress by pre-charging resources, prior to any compressed memory pages being stored in the compressed store, to allow the compressed storage manager to access a number of regions of the compressed store needed to perform the compacting without needing allocation of any additional memory pages to the compressed storage manager; the using resulting in a system that runs the program being in a temporary over-committed state, and the method further comprising ensuring that the temporary over-committed state can be alleviated by performing the compacting and evicting memory pages from the compressed store while guaranteeing forward progress of memory page read requests from the memory manager.

A computing device comprising: a memory; a memory manager configured to manage pages of the memory; and a compressed store manager configured to: compress, into a compressed store associated with a program, a first set of memory pages that have been modified by the program, memory commit for the first set of memory pages having been charged to the program, the compressed store being made up of a second set of memory pages, and the compressed store being managed by the compressed storage manager; use the memory commit charge for the first set of memory pages to conserve memory commit in the computing device; and allow, for each memory page of the first set of memory pages, the memory manager to repurpose the memory page after the memory page has been compressed into the compressed store.

Alternatively or in addition to any of the above described computing devices or systems, any one or combination of: the compressed store including a set of multiple regions, each region including a subset of the second set of memory pages, and the compressed storage manager being further configured to free, in response to one of the multiple regions becoming empty, the one region without needing additional memory pages allocated to the compressed storage manager; the compressed storage manager being further configured to pre-allocate resources, prior to any compressed memory pages being stored in the compressed store, to allow at least one eviction request at a time to be processed by the compressed storage manager, each eviction request comprising a request to remove a compressed memory page from the compressed store; the compressed storage manager being further configured to process the at least one eviction request without blocking permanently on any operation that requires one or more additional memory pages to be allocated to the compressed storage manager; the compressed store including a set of multiple regions, each region including a subset of the second set of memory pages, and the compressed storage manager being further configured to compact one of the multiple regions to fill empty gaps in the one region, the compaction being performed by the compressed storage manager without needing allocation of any additional memory pages to the compressed storage manager; the compressed storage manager being further configured to pre-charge resources, prior to any compressed memory pages being stored in the compressed store, to allow the compressed storage manager to access a number of regions of the compressed store needed to perform the compaction without needing allocation of any additional memory pages to the compressed storage manager.

A system comprising: one or more processors; and one or more computer-readable media having stored thereon multiple instructions that, when executed by the one or more processors, cause the one or more processors to perform acts comprising: identifying a first set of memory pages that have been allocated to a program and that have been modified, memory commit for the first set of memory pages having been charged to the program; compressing the first set of memory pages into a compressed store that is made up of a second set of memory pages and is managed by a compressed store manager; using, by the compressed store manager, the memory commit charge for the first set of memory pages, effective to conserve memory commit in the system; and allowing a memory manager to repurpose the first set of memory pages after the first set of memory pages has been compressed into the compressed store.

Alternatively or in addition to any of the above described systems or computing devices, any one or combination of: the compressed store including a set of multiple regions, each region including a subset of the second set of memory pages, and the acts further comprising freeing, in response to one of the multiple regions becoming empty, the one region without needing additional memory pages allocated to the compressed storage manager; the compressed storage manager pre-allocating resources, prior to any compressed memory pages being stored in the compressed store, to allow at least one eviction request at a time to be processed by the compressed storage manager, each eviction request comprising a request to remove a compressed memory page from the compressed store; the acts further comprising the compressed storage manager processing the at least one eviction request without blocking permanently on any operation that requires one or more additional memory pages to be allocated to the compressed storage manager; the compressed store including a set of multiple regions, each region including a subset of the second set of memory pages, and the acts further comprising compacting one of the multiple regions to fill empty gaps in the one region, the compacting being performed by the compressed storage manager without needing allocation of any additional memory pages to the compressed storage manager; the compressed storage manager pre-charging resources, prior to any compressed memory pages being stored in the compressed store, to allow the compressed storage manager to access a number of regions of the compressed store needed to perform the compacting without needing allocation of any additional memory pages to the compressed storage manager; the system further comprising a physical memory, a storage device on which is stored a page file that backs the physical memory, and reducing an amount of space on the storage device used by the page file due to the using the memory commit charge for the first set of memory pages.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
  identifying a first set of memory pages that have been allocated to a program and that have been modified, memory commit for the first set of memory pages having been charged to the program;
  creating, by a compressed store manager, a compressed store that is made up of a second set of memory pages and is managed by the compressed store manager;
  compressing the first set of memory pages into the compressed store;
  determining that the memory commit charge for the first set of memory pages is to be used by the compressed store manager;
  transferring, by a memory manager in response to a notification from the compressed store manager that the first set of memory pages is being compressed, a portion of the memory commit charge for the first set of memory pages to the compressed store manager without requiring a separate memory commit charge to be maintained for both the first set of memory pages and the compressed store manager into which the first set of memory pages are compressed;
  using, by the compressed store manager, the memory commit charge for the first set of memory pages; and
  allowing the memory manager to repurpose the first set of memory pages after the first set of memory pages has been compressed into the compressed store.

2. The method as recited in claim 1, the compressed store including a set of multiple regions, each region including a subset of the second set of memory pages, and the method further comprising:
  freeing, in response to one of the multiple regions becoming empty, the one region without needing additional memory pages allocated to the compressed store manager.

3. The method as recited in claim 1, the compressed store manager pre-allocating resources, prior to any compressed memory pages being stored in the compressed store, to allow at least one eviction request at a time to be processed by the compressed store manager, each eviction request comprising a request to remove a compressed memory page from the compressed store.

4. The method as recited in claim 3, further comprising the compressed store manager processing the at least one eviction request without blocking permanently on any operation that requires one or more additional memory pages to be allocated to the compressed store manager.

5. The method as recited in claim 1, the compressed store including a set of multiple regions, each region including a subset of the second set of memory pages, and the method further comprising compacting one of the multiple regions to fill empty gaps in the one region, the compacting being performed by the compressed store manager without needing allocation of any additional memory pages to the compressed store manager.

6. The method as recited in claim 5, the compressed store manager guaranteeing that the compacting makes forward progress by pre-charging resources, prior to any compressed memory pages being stored in the compressed store, to allow the compressed store manager to access a number of regions of the compressed store needed to perform the compacting without needing allocation of any additional memory pages to the compressed store manager.

7. The method as recited in claim 6, the using resulting in a system that runs the program being in a temporary over-committed state, and the method further comprising ensuring that the temporary over-committed state can be alleviated by performing the compacting and evicting memory pages from the compressed store while guaranteeing forward progress of memory page read requests from the memory manager.

8. A method as recited in claim 1, further comprising classifying the memory pages as one of multiple types of pages and maintaining a record of the classification of the memory pages, the classifying comprising updating the classification of the memory pages as the status of the memory pages change.

9. A computing device comprising:
  a memory;
  a memory manager configured to manage pages of the memory; and
  a compressed store manager configured to:
    create a compressed store that is managed by the compressed store manager;
    compress, into the compressed store associated with a program, a first set of memory pages that have been modified by the program, memory commit for the first set of memory pages having been charged to the program, the compressed store being made up of a second set of memory pages;
    determine that the memory commit charge for the first set of memory pages is to be used by the compressed store manager;
    notify, in response to determining that the first set of memory pages is being compressed, the memory manager to transfer a portion of the memory commit charge for the first set of memory pages to the compressed store manager without requiring a separate memory commit charge to be maintained for both the first set of memory pages and the compressed store manager into which the first set of memory pages are compressed;
    use the memory commit charge for the first set of memory pages; and
    allow, for each memory page of the first set of memory pages, the memory manager to repurpose the memory page after the memory page has been compressed into the compressed store.

10. The computing device as recited in claim 9, the compressed store including a set of multiple regions, each region including a subset of the second set of memory pages, and the compressed store manager being further configured to free, in response to one of the multiple regions becoming empty, the one region without needing additional memory pages allocated to the compressed store manager.

11. The computing device as recited in claim 9, the compressed store manager being further configured to pre-allocate resources, prior to any compressed memory pages being stored in the compressed store, to allow at least one eviction request at a time to be processed by the compressed store manager, each eviction request comprising a request to remove a compressed memory page from the compressed store.

12. The computing device as recited in claim 11, the compressed store manager being further configured to process the at least one eviction request without blocking permanently on any operation that requires one or more additional memory pages to be allocated to the compressed store manager.

13. The computing device as recited in claim 9, the compressed store including a set of multiple regions, each region including a subset of the second set of memory pages, and the compressed store manager being further configured to compact one of the multiple regions to fill empty gaps in the one region, the compaction being performed by the compressed store manager without needing allocation of any additional memory pages to the compressed store manager.

14. A system comprising:
   one or more processors; and
   one or more computer-readable media having stored thereon multiple instructions that, when executed by the one or more processors, cause the one or more processors to perform acts comprising:
      identifying a first set of memory pages that have been allocated to a program and that have been modified, memory commit for the first set of memory pages having been charged to the program;
      creating, by a compressed store manager, a compressed store that is made up of a second set of memory pages and is managed by the compressed store manager;
      compressing the first set of memory pages into the compressed store;
      determining that the memory commit charge for the first set of memory pages is to be used by the compressed store manager;
      transferring, by a memory manager in response to a notification from the compressed store manager that the first set of memory pages is being compressed, a portion of the memory commit charge for the first set of memory pages to the compressed store manager without requiring a separate memory commit charge to be maintained for both the first set of memory pages and the compressed store manager into which the first set of memory pages are compressed;
      using, by the compressed store manager, the memory commit charge for the first set of memory pages; and
      allowing the memory manager to repurpose the first set of memory pages after the first set of memory pages has been compressed into the compressed store.

15. The system as recited in claim 14, the compressed store including a set of multiple regions, each region including a subset of the second set of memory pages, and the acts further comprising:
   freeing, in response to one of the multiple regions becoming empty, the one region without needing additional memory pages allocated to the compressed store manager.

16. The system as recited in claim 14, the compressed store manager pre-allocating resources, prior to any compressed memory pages being stored in the compressed store, to allow at least one eviction request at a time to be processed by the compressed store manager, each eviction request comprising a request to remove a compressed memory page from the compressed store.

17. The system as recited in claim 16, further comprising the compressed store manager processing the at least one eviction request without blocking permanently on any operation that requires one or more additional memory pages to be allocated to the compressed store manager.

18. The system as recited in claim 14, the compressed store including a set of multiple regions, each region including a subset of the second set of memory pages, and the acts further comprising compacting one of the multiple regions to fill empty gaps in the one region, the compacting being performed by the compressed store manager without needing allocation of any additional memory pages to the compressed store manager.

19. The system as recited in claim 18, the compressed store manager pre-charging resources, prior to any compressed memory pages being stored in the compressed store, to allow the compressed store manager to access a number of regions of the compressed store needed to perform the compacting without needing allocation of any additional memory pages to the compressed store manager.

20. The system as recited in claim 14, the system further comprising:
   a physical memory;
   a storage device on which is stored a page file that backs the physical memory; and
   reducing an amount of space on the storage device used by the page file due to the using the memory commit charge for the first set of memory pages.

* * * * *